(12) United States Patent
Ngo et al.

(10) Patent No.: US 10,579,128 B2
(45) Date of Patent: *Mar. 3, 2020

(54) SWITCHING POWER SUPPLY FOR SUBUS SLAVES

(71) Applicant: Qorvo US, Inc., Greensboro, NC (US)

(72) Inventors: Christopher Truong Ngo, Queen Creek, AZ (US); Alexander Wayne Hietala, Phoenix, AZ (US); Praveen Varma Nadimpalli, Chandler, AZ (US)

(73) Assignee: Qorvo US, Inc., Greensboro, NC (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/443,236

(22) Filed: Feb. 27, 2017

(65) Prior Publication Data

US 2017/0255250 A1 Sep. 7, 2017

Related U.S. Application Data

(60) Provisional application No. 62/302,131, filed on Mar. 1, 2016.

(51) Int. Cl.
| | |
|---|---|
| *G06F 1/3287* | (2019.01) |
| *G06F 13/364* | (2006.01) |
| *H02M 3/07* | (2006.01) |
| *G06F 13/42* | (2006.01) |
| *G06F 13/40* | (2006.01) |

(52) U.S. Cl.
CPC .......... *G06F 1/3287* (2013.01); *G06F 13/364* (2013.01); *G06F 13/404* (2013.01); *G06F 13/4282* (2013.01)

(58) Field of Classification Search
CPC ....... G06F 1/3287; G06F 13/364; H02M 3/07

USPC ............ 710/1, 106, 110, 315; 713/300, 600
See application file for complete search history.

(56) References Cited

U.S. PATENT DOCUMENTS

| | | |
|---|---|---|
| 3,953,835 A | 4/1976 | Cuccio et al. |
| 5,684,803 A | 11/1997 | Nguyen |
| 5,787,132 A | 7/1998 | Kishigami et al. |
| 5,832,207 A | 11/1998 | Little et al. |
| 6,408,163 B1 | 6/2002 | Fik |

(Continued)

OTHER PUBLICATIONS

Non-Final Office Action for U.S. Appl. No. 14/575,491, dated May 26, 2017, 20 pages.

(Continued)

*Primary Examiner* — Farley Abad
*Assistant Examiner* — Henry W Yu
(74) *Attorney, Agent, or Firm* — Withrow & Terranova, P.L.L.C.

(57) ABSTRACT

This disclosure relates generally to digital bus interfaces. In one embodiment, a bus interface system includes a master bus controller and a slave bus controller coupled along a bus line. The master bus controller is configured to generate an input data signal that is received by the slave bus controller along the bus line. The slave bus controller includes power conversion circuitry that includes a power converter configured to convert the input data signal from the master bus controller into a supply voltage. The power conversion circuitry is also configured to generate a charge current from the input data signal. In this manner, the charge current can be used to regulate the supply voltage and maintain the appropriate charge.

20 Claims, 10 Drawing Sheets

(56) References Cited

U.S. PATENT DOCUMENTS

| | | | |
|---|---|---|---|
| 6,484,268 B2* | 11/2002 | Tamura | G11C 7/1072 710/58 |
| 7,685,320 B1 | 3/2010 | Wishneusky | |
| 7,729,427 B2 | 6/2010 | Kwok | |
| 8,509,318 B2 | 8/2013 | Tailliet | |
| 9,430,321 B2 | 8/2016 | Slik | |
| 9,519,612 B2 | 12/2016 | Hietala et al. | |
| 9,569,386 B2 | 2/2017 | Du | |
| 9,639,500 B2 | 5/2017 | Bas et al. | |
| 9,652,451 B2 | 5/2017 | Elder | |
| 9,690,725 B2 | 6/2017 | Sengoku | |
| 9,755,821 B2 | 9/2017 | Jang et al. | |
| 9,946,677 B2 | 4/2018 | Hapke | |
| 2001/0050713 A1 | 12/2001 | Kubo et al. | |
| 2004/0049619 A1 | 3/2004 | Lin | |
| 2004/0100400 A1 | 5/2004 | Perelman et al. | |
| 2004/0128594 A1 | 7/2004 | Elmhurst et al. | |
| 2004/0221067 A1* | 11/2004 | Huang | G06F 13/4045 710/1 |
| 2005/0012492 A1 | 1/2005 | Mihalka | |
| 2006/0050694 A1 | 3/2006 | Bury et al. | |
| 2006/0152236 A1 | 7/2006 | Kim | |
| 2006/0236008 A1 | 10/2006 | Asano et al. | |
| 2009/0248932 A1 | 10/2009 | Taylor et al. | |
| 2011/0035632 A1 | 2/2011 | Hong et al. | |
| 2011/0113171 A1* | 5/2011 | Radhakrishnan | G06F 13/4291 710/110 |
| 2012/0027104 A1* | 2/2012 | Bas | G06F 13/4295 375/253 |
| 2012/0030753 A1 | 2/2012 | Bas et al. | |
| 2012/0226965 A1 | 9/2012 | Hammerschmidt et al. | |
| 2012/0303836 A1 | 11/2012 | Ngo et al. | |
| 2013/0054850 A1 | 2/2013 | Co | |
| 2013/0124763 A1* | 5/2013 | Kessler | G06F 13/4295 710/110 |
| 2013/0132624 A1 | 5/2013 | Chen et al. | |
| 2013/0197920 A1 | 8/2013 | Lesso et al. | |
| 2013/0265884 A1 | 10/2013 | Brombal et al. | |
| 2013/0301689 A1 | 11/2013 | Marchand et al. | |
| 2014/0025999 A1 | 1/2014 | Kessler | |
| 2014/0376278 A1* | 12/2014 | Fornage | H02M 1/42 363/21.12 |
| 2015/0056941 A1 | 2/2015 | Lin et al. | |
| 2015/0074306 A1 | 3/2015 | Ayyagari et al. | |
| 2015/0106541 A1 | 4/2015 | Southcombe et al. | |
| 2015/0127862 A1* | 5/2015 | Fan | H04B 3/542 710/110 |
| 2015/0169482 A1 | 6/2015 | Ngo et al. | |
| 2015/0192974 A1 | 7/2015 | Ngo et al. | |
| 2015/0193297 A1 | 7/2015 | Ngo et al. | |
| 2015/0193298 A1 | 7/2015 | Ngo et al. | |
| 2015/0193321 A1 | 7/2015 | Ngo et al. | |
| 2015/0193373 A1* | 7/2015 | Ngo | G06F 13/4291 710/110 |
| 2016/0050513 A1 | 2/2016 | Wang et al. | |
| 2016/0124892 A1 | 5/2016 | Amarilio et al. | |

OTHER PUBLICATIONS

Non-Final Office Action for U.S. Appl. No. 14/659,379, dated Apr. 7, 2017, 37 pages.
Final Office Action for U.S. Appl. No. 14/659,292, dated Apr. 30, 2018, 24 pages.
Final Office Action for U.S. Appl. No. 14/659,328, dated Mar. 20, 2018, 61 pages.
Final Office Action for U.S. Appl. No. 14/659,355, dated Apr. 17, 2018, 11 pages.
Final Office Action for U.S. Appl. No. 14/659,371, dated May 3, 2018, 21 pages.
Notice of Allowance for U.S. Appl. No. 14/659,379, dated Mar. 20, 2018, 10 pages.
U.S. Appl. No. 14/575,491, filed Dec. 18, 2014.
U.S. Appl. No. 14/659,292, filed Mar. 16, 2015.
U.S. Appl. No. 14/659,328, filed Mar. 16, 2015.
U.S. Appl. No. 14/659,355, filed Mar. 16, 2015.
U.S. Appl. No. 14/659,371, filed Mar. 16, 2015.
U.S. Appl. No. 14/659,379, filed Mar. 16, 2015.
U.S. Appl. No. 15/365,295, filed Nov. 30, 2016.
U.S. Appl. No. 15/365,315, filed Nov. 30, 2016.
Non-Final Office Action for U.S. Appl. No. 14/575,491, dated Nov. 30, 2017, 18 pages.
Advisory Action for U.S. Appl. No. 14/659,379, dated Feb. 26, 2018, 3 pages.
Advisory Action for U.S. Appl. No. 14/659,292, dated Aug. 10, 2018, 3 pages.
Notice of Allowance for U.S. Appl. No. 14/659,328, dated Jul. 2, 2018, 8 pages.
Advisory Action for U.S. Appl. No. 14/659,355, dated Jul. 5, 2018, 3 pages.
Advisory Action for U.S. Appl. No. 14/659,371, dated Aug. 1, 2018, 3 pages.
Non-Final Office Action for U.S. Appl. No. 15/467,790, dated Jun. 28, 2018, 14 pages.
Ex Parte Quayle Action for U.S. Appl. No. 15/365,315, mailed Jul. 26, 2018, 7 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Author Unknown, "1-Wire," Wikipedia, last modified Jan. 16, 2015, accessed Feb. 12, 2015, http://en.wikipedia.org/wiki/1-Wire, 4 pages.
Author Unknown, "DS1822: Econo 1-Wire Digital Thermometer," Maxim Integrated, 2007, 21 pages.
Author Unknown, "Maxim 1-Wire® Tutorial," Maxim, online audiovisual presentation, 17 slides, No Date, accessed Feb. 12, 2015, http://www.maximintegrated.com/products/1-wire/flash/overview/ (38 images of slides).
Awtry, Dan, et al., "Design Guide v1.0," Springbok Digitronics, Aug. 19, 2004, 96 pages.
Non-Final Office Action for U.S. Appl. No. 14/659,292, dated Sep. 29, 2017, 27 pages.
Non-Final Office Action for U.S. Appl. No. 14/659,328, dated Sep. 8, 2017, 51 pages.
Non-Final Office Action for U.S. Appl. No. 14/659,355, dated Sep. 20, 2017, 32 pages.
Non-Final Office Action for U.S. Appl. No. 14/659,371, dated Sep. 25, 2017, 23 pages.
Final Office Action for U.S. Appl. No. 14/659,379, dated Oct. 18, 2017, 44 pages.
Non-Final Office Action for U.S. Appl. No. 14/659,292, dated Dec. 21, 2018, 23 pages.
Non-Final Office Action for U.S. Appl. No. 14/659,355, dated Oct. 12, 2018, 8 pages.
Final Office Action for U.S. Appl. No. 15/467,790, dated Nov. 5, 2018, 15 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Advisory Action for U.S. Appl. No. 15/467,790, dated Feb. 26, 2019, 3 pages.
Final Office Action for U.S. Appl. No. 14/659,292, dated Jun. 4, 2019, 24 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Notice of Allowance for U.S. Appl. No. 15/467,790, dated May 20, 2019, 8 pages.
Notice of Allowance for U.S. Appl. No. 15/886,209, dated Sep. 11, 2019, 7 pages.
Final Office Action for U.S. Appl. No. 15/365,295, dated Aug. 15, 2019, 11 pages.
Corrected Notice of Allowance for U.S. Appl. No. 15/467,790, dated Aug. 15, 2019, 6 pages.

(56) References Cited

OTHER PUBLICATIONS

Corrected Notice of Allowance for U.S. Appl. No. 15/467,790, dated Aug. 28, 2019, 6 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.

* cited by examiner

SWITCHING POWER SUPPLY FOR SUBUS SLAVES

RELATED APPLICATIONS

This application claims the benefit of provisional patent application Ser. No. 62/302,131, filed Mar. 1, 2016, the disclosure of which is hereby incorporated herein by reference in its entirety.

FIELD OF THE DISCLOSURE

This disclosure relates generally to digital bus interfaces.

BACKGROUND

To reduce the number of bus lines need to communicate and power a bus interface system, it would be desirable for slave bus controllers to derive power from an input data signal so that a separate bus line does not have to be provided in order to power the slave bus controller. This is highly advantageous in modern cellular telephones in which space is at a premium and running multiple bus lines between a master bus controller device and slave bus controller can be spatially inefficient.

The problem is that any power system that receives power from the input data signal needs to maintain storage elements isolated from the bus line but then needs to use power in those storage elements to send data along the same bus line. Unfortunately, in current power systems the supply voltage of the slave bus controller slowly droops and cannot maintain the appropriate charge. Thus, what are need are systems that derive power from the input data signal while maintaining the appropriate charge

SUMMARY

Embodiments of bus interface systems are disclosed. In one embodiment, a bus interface system includes a master bus controller and a slave bus controller coupled along a bus line. The master bus controller is configured to generate an input data signal that is received by the slave bus controller along the bus line. The slave bus controller includes power conversion circuitry that includes a power converter configured to convert the input data signal from the master bus controller into a supply voltage. The power conversion circuitry is also configured to generate a charge current from the input data signal. In this manner, the charge current can be used to regulate the supply voltage and maintain the appropriate charge.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6:
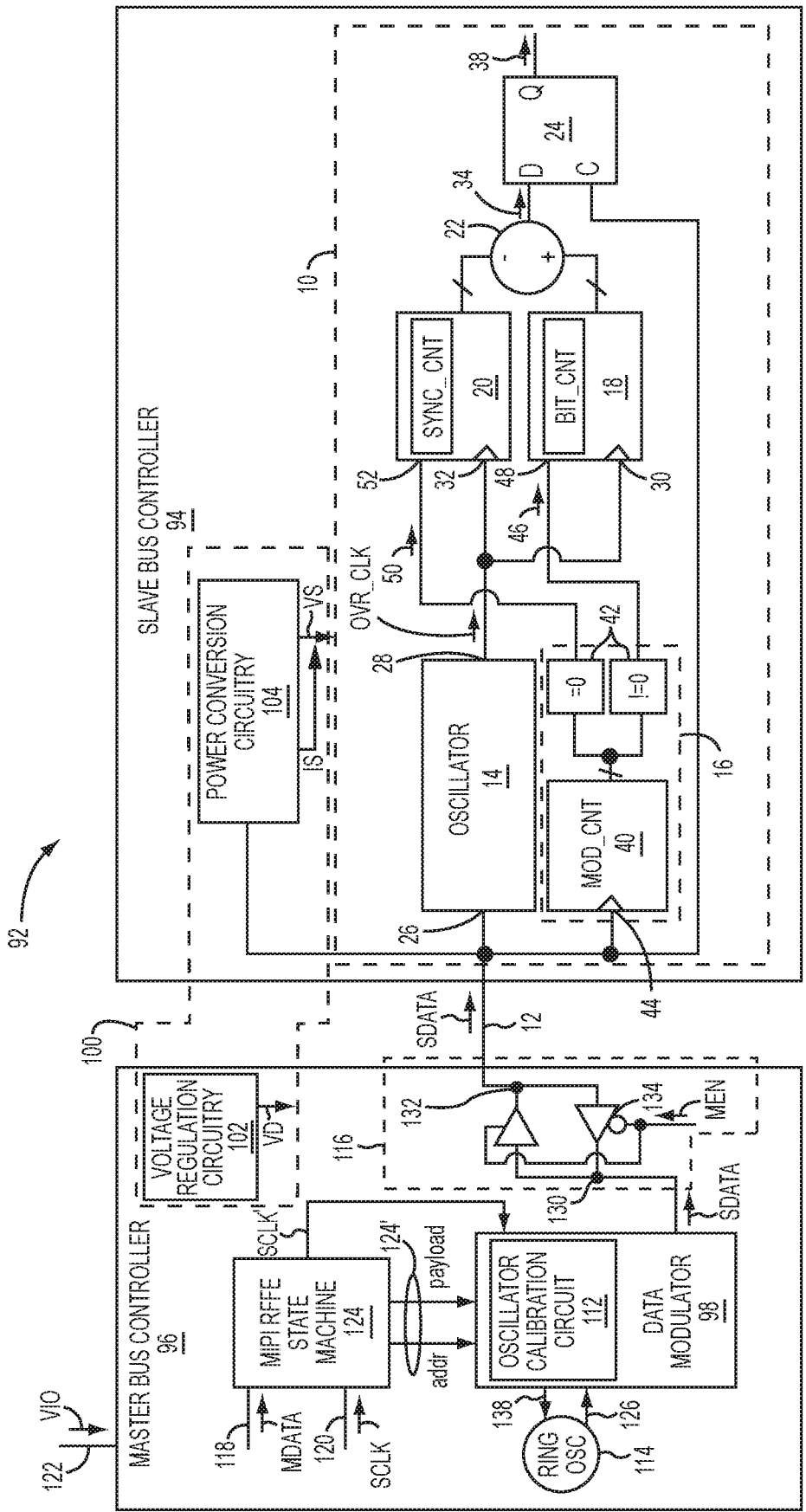
FIG. 6 illustrates another exemplary embodiment of the bus interface system that includes exemplary embodiments of the slave bus controller and the master bus controller shown in FIG. 5, where the master bus controller is a bridge bus controller.
Figure 7:
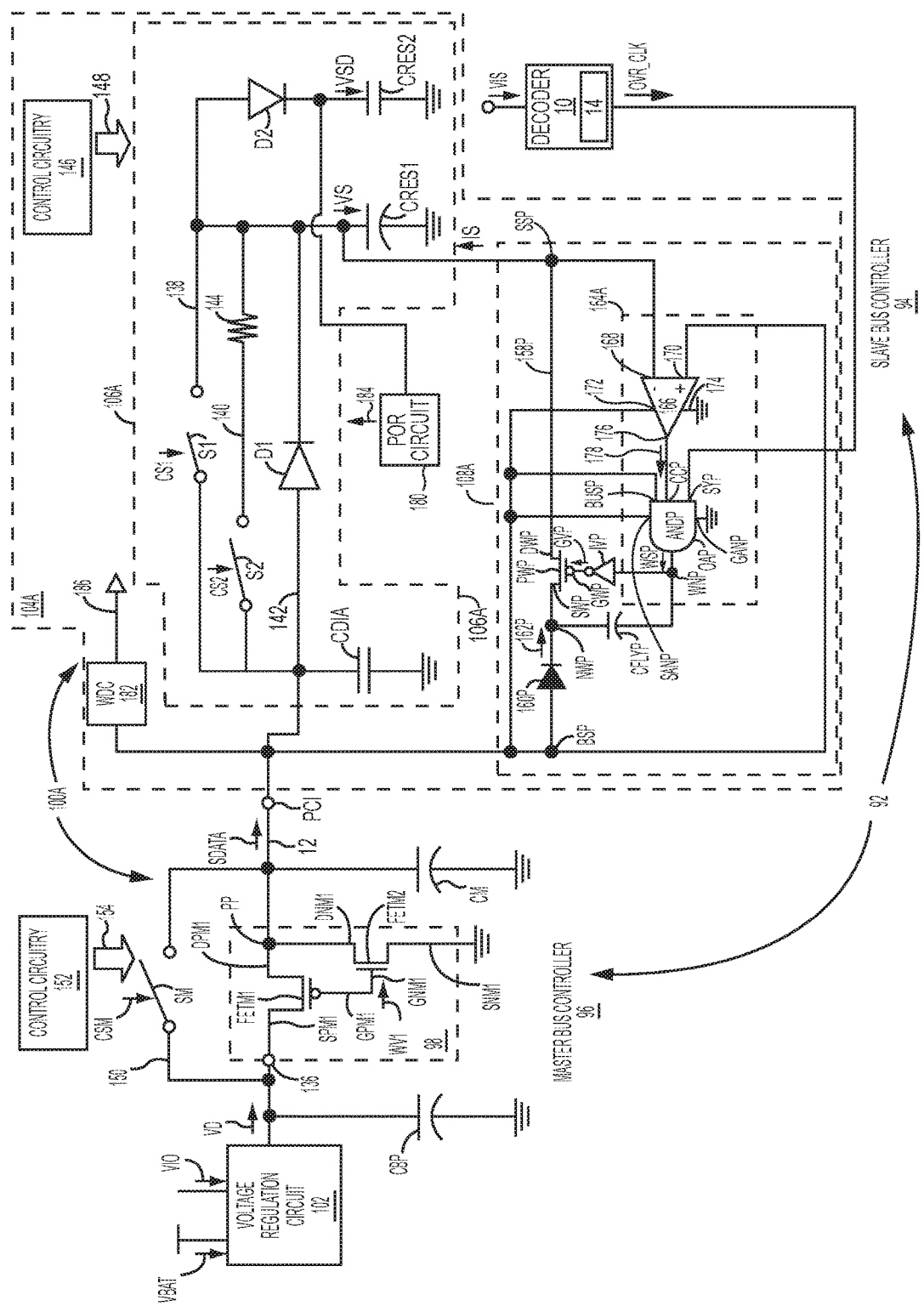
FIG. 7 illustrates an embodiment of the bus interface system shown in FIG. 6 that includes one embodiment of a power converter and one embodiment of a switch regulator that generates a pulsed charge current that is synchronized in accordance with an oscillation signal and generates current pulses during oscillation pulses.
Figure 8:
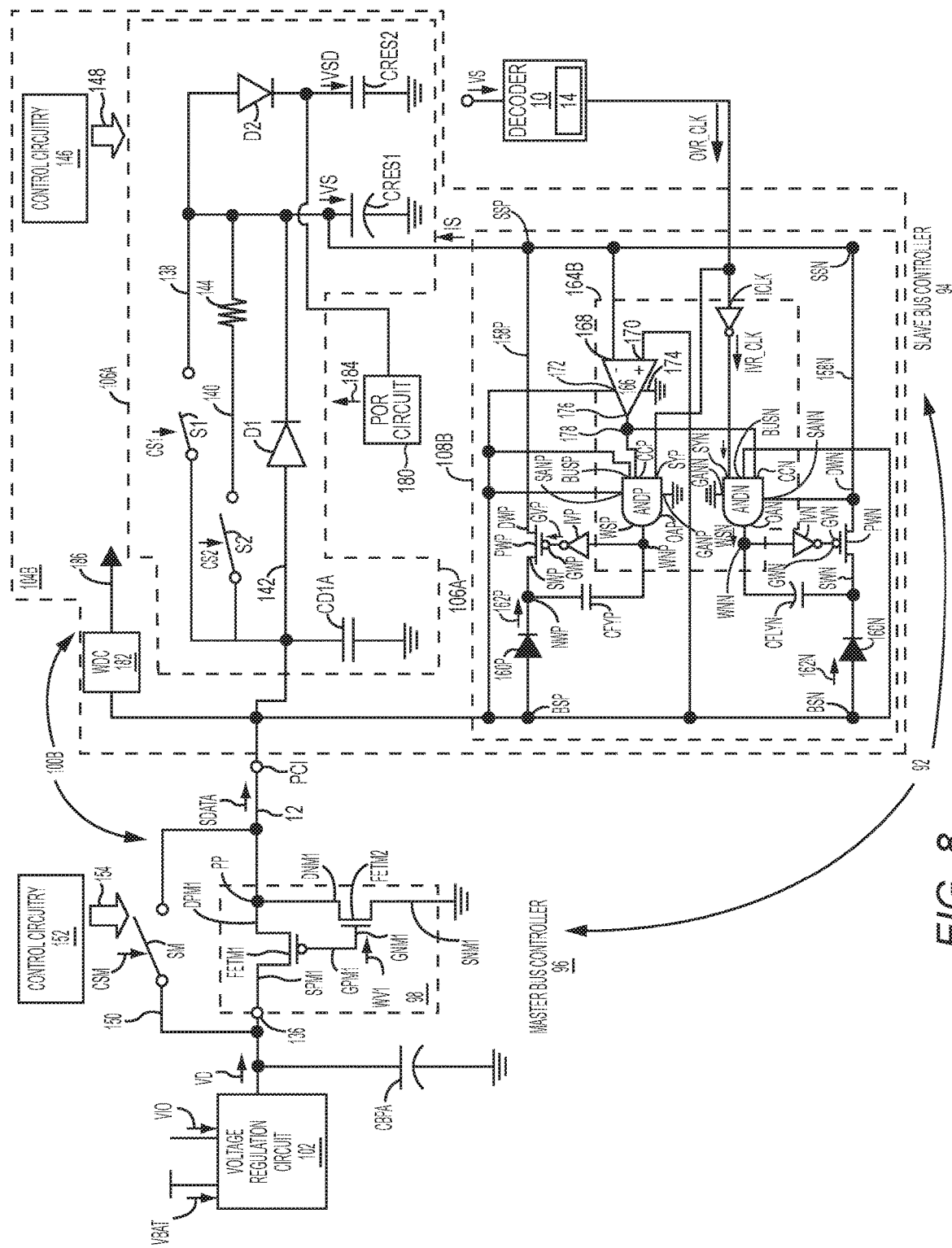

FIG. 8 illustrates an embodiment of the bus interface system shown in FIG. 6 that includes the same embodiment of the power converter shown in FIG. 7 and another embodiment of a switch regulator that generates a pulsed charge current synchronized in accordance with the oscillation signal but generates current pulses during both the rising and falling edges of oscillation pulses of the oscillation signal.

Figure 9:
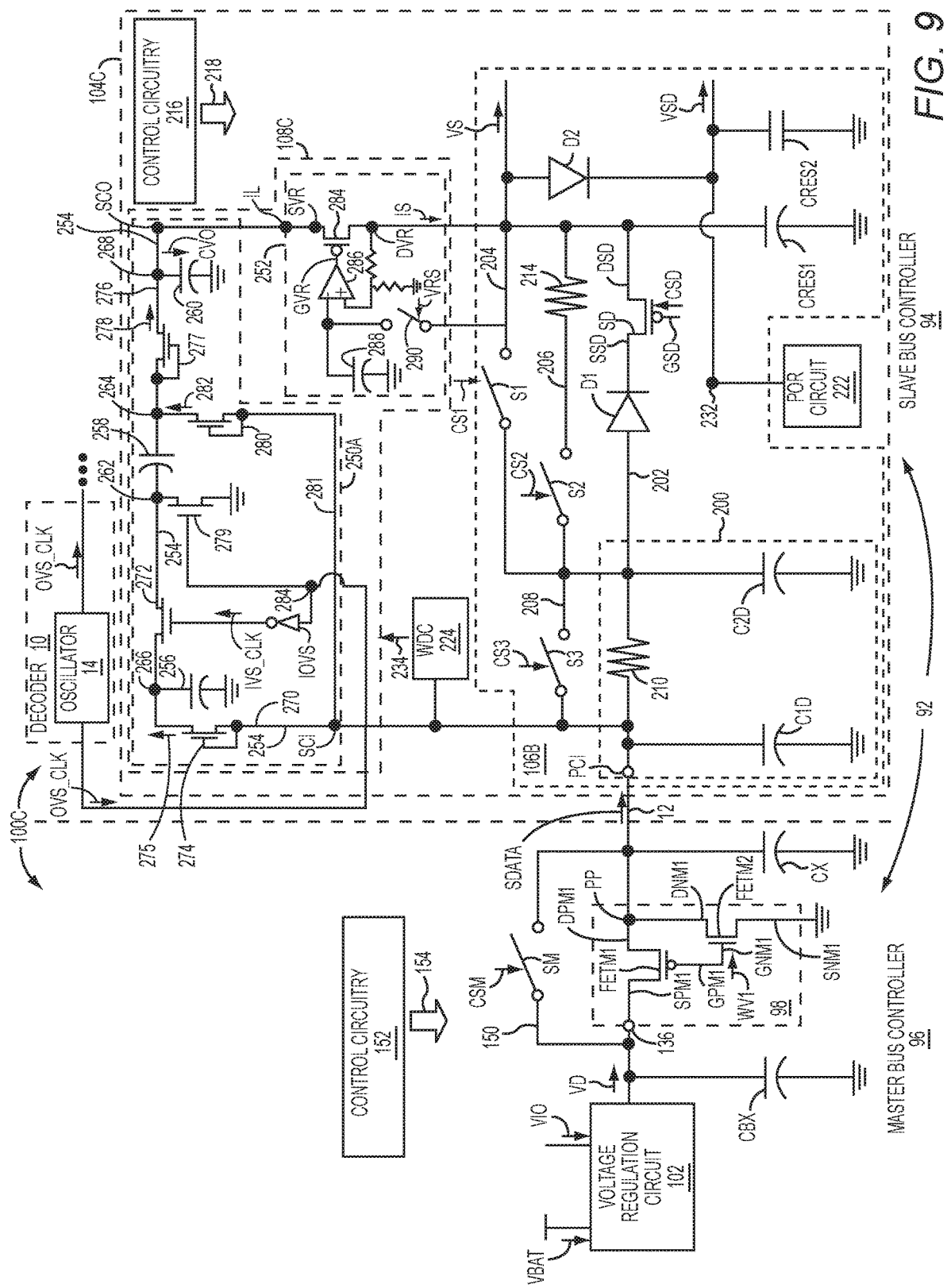

FIG. 9 illustrates an embodiment of the bus interface system shown in FIG. 6 that includes another embodiment of a power converter and another embodiment of a switch regulator that includes a switch converter synchronized in accordance with an oscillation signal and is post regulated by a linear voltage regulation circuit.

Figure 10:
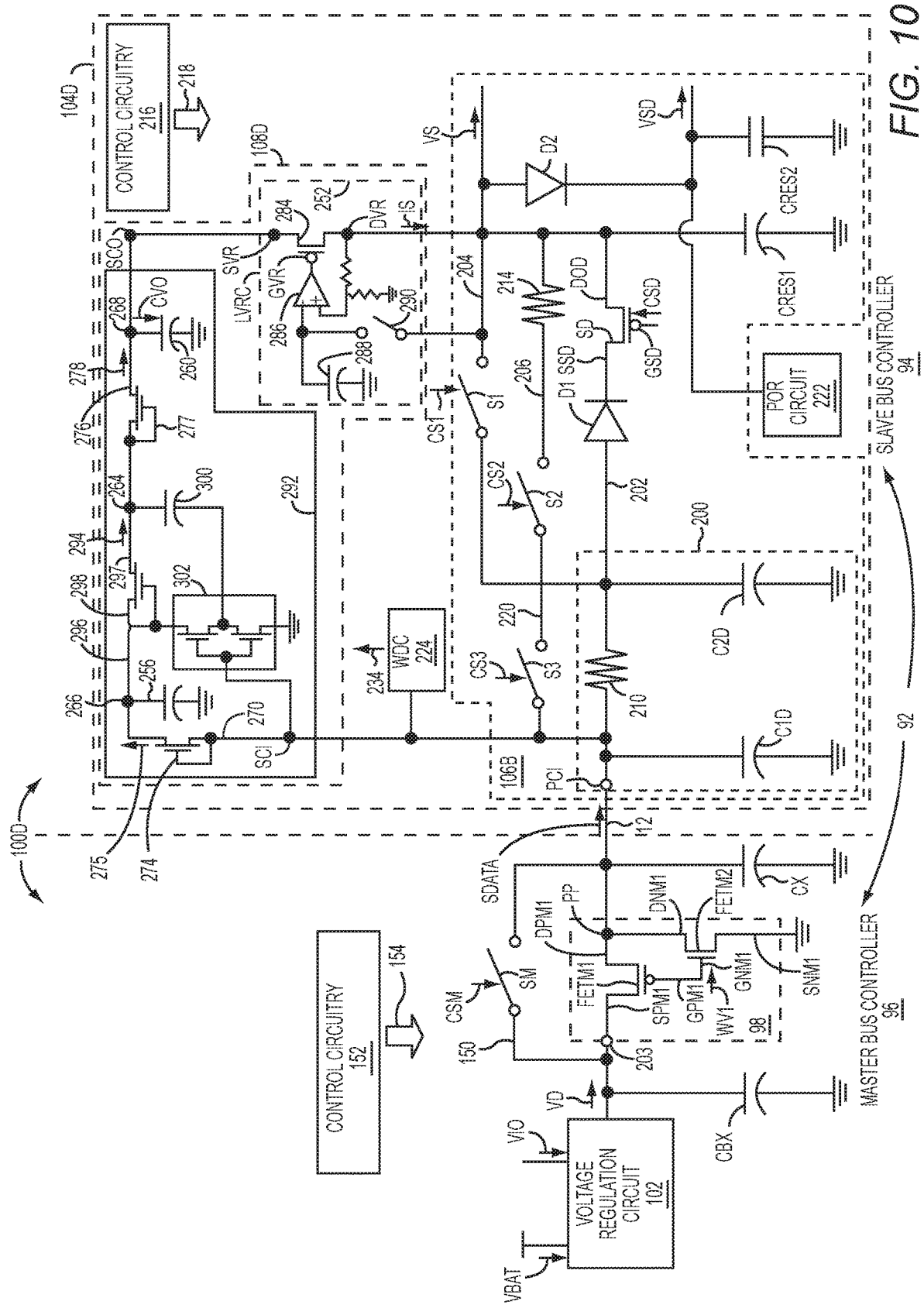

FIG. 10 illustrates an embodiment of the bus interface system shown in FIG. 6 that includes the same embodiment of the power converter shown in FIG. 9 and includes a switch regulator that includes a switch converter synchronized by the bus line and is post regulated by the same linear voltage regulation circuit shown in FIG. 9.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
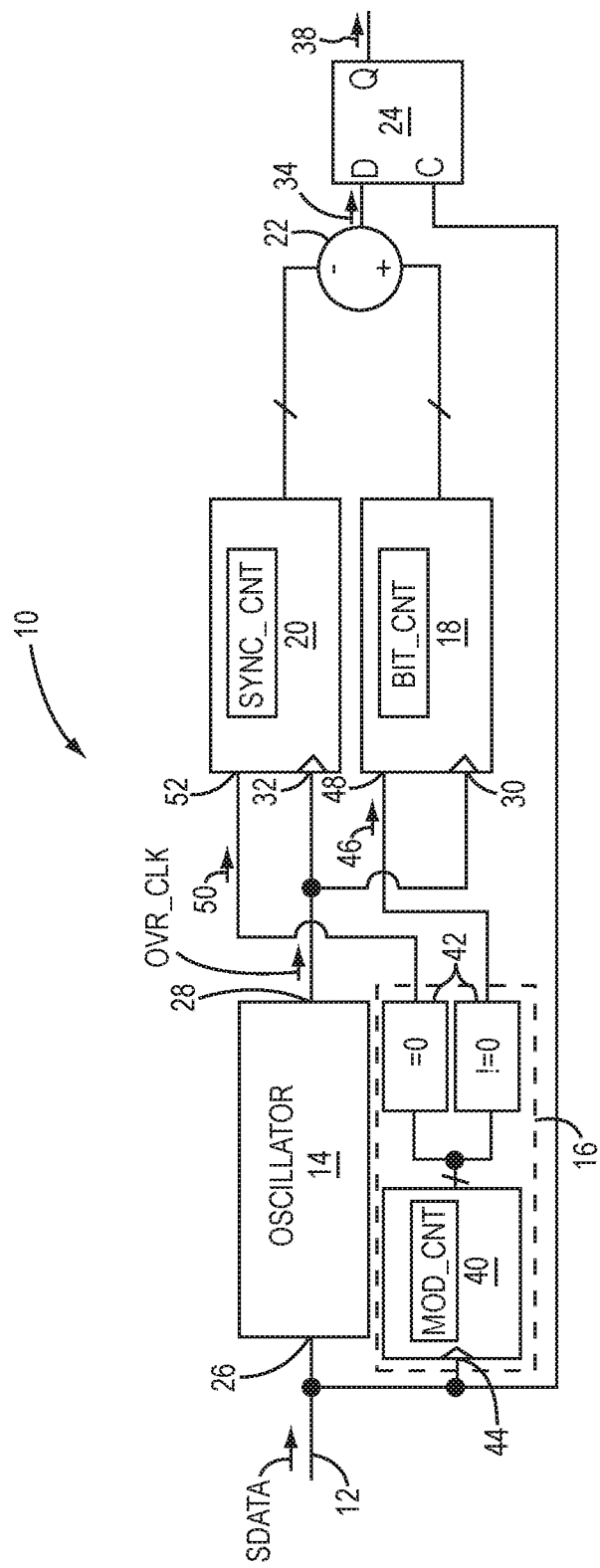
FIG. 1 illustrates one embodiment of a decoder, which may be provided in a bus controller of a bus interface system.

FIG. 1 illustrates one embodiment of a decoder 10, which may be provided in a bus controller of a bus interface system, such as a digital interface bus system. The decoder 10 is configured to receive an input data signal SDATA. The input data signal SDATA may be provided along a bus line 12 to the bus controller. The input data signal SDATA may define data pulses in order to represent data being transmitted along the bus line 12. For example, the input data signal SDATA may define data pulses such that logical values (e.g. bit values, logical symbols) are represented in accordance with a PWM bus protocol by the data pulses. More specifically, different logical values may be represented by a temporal duration of a data pulse during a time slot. As explained in further detail below, the PWM bus protocol also allows for the decoder 10 to be clocked by the input data signal SDATA itself, and thus an additional bus line does not have to be provided for a system clock signal in order to synchronize the decoder 10.

With regard to the input data signal SDATA, the data pulses defined by the input data signal SDATA are provided during time slots. More specifically, each of the data pulses may be provided during a different one of the time slots. The PWM bus protocol may organize the data pulses into data frames, where the data frame includes a certain number of the data pulses provided during a certain number of time slots. A temporal length of the time slots and thus of the data frame may be defined by the PWM bus protocol. For example, the PWM bus protocol may also allow for a bus address and a payload to be provided during certain time slots of the data frame. In some embodiments, an initial time slot of the data frame may be utilized to indicate that a data frame is to begin since the input data signal SDATA may be held in a charging state during idle time intervals when no data frames are being transmitted along the bus line. Subsequently, a calibration pulse is may be transmitted to initiate the data frame and calibrate the decoder 10 as explained in further detail below. Accordingly, both the bus address and the payload can be provided by the input data signal SDATA so that additional address or data bus lines do not have to be provided. Furthermore, since the input data signal SDATA can also be used to calibrate the decoder 10, additional clock lines also do not have to be provided to synchronize the decoder 10. In this manner, a bus controller with the decoder 10, such as a slave bus controller, can extract both a bus address and a payload without requiring additional bus lines.

As shown in FIG. 1, the decoder includes an oscillator 14, counter enabling circuitry 16, a first counter 18, a second counter 20, a comparison circuit 22 and a sequential state element 24. The oscillator 14 is operable to receive the input data signal SDATA from the bus line 12. As mentioned above, each of the data pulses may be provided during a different one of the time slots. In other words, the data pulses provided by the input data signal SDATA may correspond injectively with the time slots.

In this embodiment, the oscillator 14 includes an enabling terminal 26 and is coupled to the bus line 12 so that the input data signal SDATA is received at the enabling terminal 26. In this manner, the oscillator 14 is configured to be enabled by the data pulses of the input data signal SDATA. In other words, the oscillator 14 is triggered by an activating edge of each of the data pulses of the input data signal SDATA. The oscillator 14 is configured to generate oscillation pulses while enabled. The oscillator 14 shown in FIG. 1 is operable to provide an oscillation signal OVR_CLK from an output terminal 28 of the oscillator 14. While enabled, the oscillator 14 is configured to provide the oscillation signal OVR_CLK so that the oscillation signal OVR_CLK defines the oscillation pulses. The oscillator 14 is then deactivated in response to an end of the data pulse. More specifically, the oscillator 14 is deactivated and does not generate oscillation pulses in response to a deactivation edge of each of the data pulses of the input data signal SDATA. While deactivated, the oscillation signal OVR_CLK does not provide the oscillation pulses and thus does not provide the oscillation signal OVR_CLK. The oscillation signal OVR_CLK is held in a deactivation state while the oscillator 14 is not enabled and deactivated. Since the oscillator 14 is enabled by the data pulses of the input data signal SDATA and deactivated when the data pulses of the input data signal SDATA are not provided, the decoder 10 is more power efficient. For instance, little to no current may be drawn by the oscillator 14 when deactivated as a result of the input data signal SDATA being inactive (or low) between the data pulses. When the oscillator 14 is deactivated, the oscillator 14 does not generate the oscillation pulses, and thus little to no power may be consumed by the oscillator 14 while deactivated.

In accordance with the PWM bus protocol, a pulse rate of the oscillation signal OVR_CLK is significantly greater than a pulse rate of the data pulses of the input data signal SDATA. For example, the oscillator 14 is configured to generate the oscillation pulses when enabled at a pulse rate that is at least three times greater than a pulse rate of the data pulses. Thus, for a particular data pulse provided during a particular time slot, a temporal duration (i.e., a pulse width) of the particular data pulse in the input data signal SDATA can be determined by the number of oscillation pulses provided in the oscillation signal OVR_CLK during the particular time slot. The PWM bus protocol assigns different temporal durations (i.e., different pulse widths) to different logical values. In this manner, the decoder 10 can count the number of oscillation pulses provided in the oscillation signal OVR_CLK during the particular time slot and thereby determine the logical value being represented by the particular data pulse during that particular time slot, as explained in further detail below. Note that how much greater the pulse rate of the oscillation signal OVR_CLK is with respect to the pulse rate of the input data signal SDATA may depend on various factors such as a cardinality of the set of logical values that can be represented by each of the data pulses and an acceptable error rate in discriminating between the different logical values. For example, it is easier to discriminate what logical value a data pulse represents if a set of logical values that can be represented by the data pulse only includes a bit value of "1" and a bit value "0." Thus, the pulse rate of the oscillation signal OVR_CLK can be lower if desired in this case. It is more difficult to discriminate what logical value a particular data pulse represents if the set of logical values includes logical symbols, such as "0," "1," "2." However, the greater the cardinality of the set of logical values that can be represented by the data pulse, the greater the informational efficiency of the PWM bus protocol.

As shown in FIG. 1, both the first counter 18 and the second counter 20 are configured to receive the oscillation signal OVR_CLK from the oscillator 14. More specifically, the first counter 18 includes an input terminal 30 coupled to the output terminal 28 of the oscillator 14 so that the first counter 18 receives the oscillation signal OVR_CLK at the input terminal 30. The second counter 20 includes an input terminal 32 coupled to the output terminal 28 of the oscillator 14 so that the second counter 20 receives the oscillation signal OVR_CLK at the input terminal 32. The first counter 18 and the second counter 20 are each enabled and disabled by the counter enabling circuitry 16.

In some PWM bus protocols, the first input data signal SDATA may be held in a charging state during idle time intervals but may also be provided in the charging state during a data pulse. Thus, to initiate the data frame, an initial time slot will be utilized to bring the first input data signal SDATA into a discharging state to indicate that a data frame is being initiated. The decoder 10 is operable to be activated and deactivated so that the oscillator 14 cannot operate during idle time intervals even though the first input data signal SDATA is in a charging state. Accordingly, the oscillator 14 is disabled during idle time intervals and thus is not operating while the first input data signal SDATA is held in the charging state during idle time intervals. In this manner, the first input data signal SDATA can be held in the charging state but maintain the oscillator 14 deactivated. The decoder 10 is activated in response to the initial time slot and thus the decoder 10 can be used to decode data pulses in the first input data signal SDATA that are provided while the first input data signal is in the charging state. After the data frame is finished, the counter enabling circuitry 16 may again be disabled so that the first input data signal SDATA can again be held in the charging state during idle time intervals.

With regard to the first counter 18 and the second counter 20, the first counter 18 is operable to store a first count parameter BIT_CNT. While the first counter 18 is enabled by the counter enabling circuitry 16, the first counter 18 is configured to increment the first count parameter BIT_CNT in response to each of the oscillation pulses provided by the oscillation signal OVR_CLK. When the first counter 18 is disabled by the counter enabling circuitry 16, the first counter 18 holds the first count parameter BIT_CNT at its current value. The second counter 20 is operable to store the reference parameter SYNC_CNT. While the second counter 20 is enabled by the counter enabling circuitry 16, the second counter 20 is configured to increment the reference parameter SYNC_CNT in response to each of the oscillation pulses provided by the oscillation signal OVR_CLK. When the second counter 20 is disabled by the counter enabling circuitry 16, the second counter 20 holds the reference parameter SYNC_CNT at its current value or may divide the current value by some known ratio and then hold the divided value of the reference parameter SYNC_CNT.

The input data signal SDATA may be formatted in accordance with the PWM bus protocol so that the data pulses defined by the input data signal SDATA during the time slots are organized into data frames. As explained above, for each data frame, an initial time slot may not include a data pulse but may simply bring the input data signal SDATA into the discharging state to indicate that the data frame has been started. The decoder 10 will then be activated. Following the initial time slot is a calibration time slot. A data pulse provided during the calibration time slot is a calibration pulse, which may be provided by a bus controller (e.g., a master bus controller as explained in further detail below) with a precise pulse duration. By measuring the pulse duration of the calibration pulse, pulse durations for distinguishing between different logical values can be determined along with the temporal length of a standard time slot. In this manner, manufacturing variations, variations due to the operation environment, and variations in operations due to aging can be compensated. In the examples discussed herein, the calibration pulse may be provided so as to have a time duration equal to approximately 200% percent as long as the time interval of a standard time slot. Once the decoder 10 is activated, the oscillator 14 is configured to be enabled by the calibration data pulse. As explained in further detail below, the counter enabling circuitry 16 is configured to disable the first counter 18 and enable the second counter 20 during the calibration time slot of the data frame. Also, the second counter 20 may have reset the reference parameter SYNC_CNT to an initial value (e.g., such as zero) prior to an activation edge of the calibration pulse during the initial time slot. Thus, during the calibration time slot of each of the data frames, the second counter 20 is configured to count the oscillation pulses defined by the oscillation signal OVR_CLK. In this manner, the reference parameter SYNC_CNT indicates a reference number, and the reference number is based on how many of the oscillation pulses were generated by the oscillator 14 during the calibration time slot as a result of the calibration pulse. In this example, the reference number is equal to the oscillation pulses that were generated by the oscillator 14 during the calibration time slot divided by four. This reference number is used to determine logical values of a remainder of the data pulses provided in the data frame. By making the decoder 10 responsive to the calibration pulse as described above, the decoder 10 can be synchronized and calibrated by the input data signal SDATA itself without having to receive an external clock signal on another bus line.

In accordance with the PWM bus protocol, the remainder of the data pulses provided in the other time slots of the data frame may represent a bus address, a payload, and/or the like. To recover the logical value represented by a data pulse during a time slot, the first counter 18 is configured to count the oscillation pulses such that the first count parameter BIT_CNT indicates a number of the oscillation pulses generated during the time slot. More specifically, after the calibration time slot, the counter enabling circuitry 16 is configured to disable the second counter 20 and enable the first counter 18 in response to the data pulse defined by the input data signal SDATA during the time slot. Thus, for the remainder of the time slots in the data frame, the second counter 20 holds the reference parameter SYNC_CNT indicating the reference number, which is fraction of how many of the oscillation pulses were generated by the oscillator during the calibration time slot as a result of the calibration pulse.

The first counter 18 is configured to reset the first count parameter BIT_CNT to an initial value (e.g., zero) in response to the activation edge of the data pulse. In response to the data pulse defined by the input data signal SDATA during the time slot, the oscillator 14 is configured to be enabled by the data pulse of the input data signal SDATA and generate oscillation pulses while enabled. The first counter 18 (which has been enabled by the counter enabling circuitry 16) is configured to increment the first count parameter BIT_CNT in response to the oscillation pulses from the oscillator 14. Thus, for each of the data pulses provided after the calibration time slot, the first counter 18 is configured to count the oscillation pulses defined by the oscillation signal OVR_CLK such that the first count parameter BIT_CNT indicates a number of the oscillation pulses generated during the time slot. The oscillation pulses defined by the oscillation signal OVR_CLK were generated as a result of the data pulse of the input data signal SDATA. In this manner, the first count parameter BIT_CNT indicates how many of the oscillation pulses were generated during the time slot during the data pulse of the input data signal SDATA.

To determine the logical value of the data pulse from the first count parameter BIT_CNT, the comparison circuit 22 is configured to compare the first count parameter BIT_CNT with the reference parameter SYNC_CNT. As explained above, the reference parameter SYNC_CNT indicates the reference number, which is based on a count of the oscillation pulses that were generated by the oscillator 14 during the calibration time slot as a result of the calibration pulse at the beginning of the data frame. The PWM bus protocol may define a set of logical values that may be represented by each of the data pulses provided during the time slots of the data frame after the calibration time slot. The comparison circuit 22 is configured to generate a data output 34 such that the data output 34 represents a first logical value in response to the first count parameter BIT_CNT being greater than the reference parameter SYNC_CNT and such that the data output 34 represents a second logical value in response to the first count parameter BIT_CNT being less than the reference parameter SYNC_CNT.

For a bit scheme, the set of logical values may be the set of bit values [0, 1]. In the embodiment shown in FIG. 1, the comparison circuit 22 is configured to the data output 34 as a data output signal such that the data output signal represents an output bit. The output bit is a first bit value (e.g., bit value of 1 in the set of bit values [0, 1]) if the first count parameter BIT_CNT is greater than the reference parameter SYNC_CNT. For example, in this case, the data pulse defined during the time slot by the data pulse of the input data signal SDATA had a temporal duration that was longer than a fraction of the temporal duration of the calibration pulse defined by the data pulse of the input data signal SDATA during the calibration time slot. As a result, the number of oscillation pulses provided by the oscillation signal OVR_CLK during this time slot is greater than the number of oscillation pulses provided during the calibration time slot divided by four. Thus, the comparison circuit 22 will determine that the first count parameter BIT_CNT is greater than the reference parameter SYNC_CNT and generate the data output 34 such that the data output 34 represents the first bit value (e.g., the bit value 1).

The output bit is a second bit value (e.g., bit value of 0 in the set of bit values [0, 1]) if the first count parameter BIT_CNT is less than the reference parameter SYNC_CNT. In this case, the data pulse defined during the time slot by the data pulse of the input data signal SDATA had a temporal duration that was shorter than the fraction of a temporal duration of the calibration pulse defined by the data pulse of the input data signal SDATA during the calibration time slot. As a result, the number of oscillation pulses provided by the oscillation signal OVR_CLK during this time slot is less than the number of oscillation pulses provided during the calibration time slot divided by four. Thus, the comparison circuit 22 will determine that the first count parameter BIT_CNT is less than the reference parameter SYNC_CNT and generate the data output 34 such that the data output 34 represents the second bit value (e.g., the bit value 0).

The sequential state element 24 is configured to receive the data output 34 and store the output bit represented by the data output 34, which in this example is provided by a data output signal. In this example, the sequential state element 24 is a flip-flop that has a data input terminal D, a clock terminal C, and a data output terminal Q. The data output 34 (e.g., the data output signal) is received by the sequential state element 24 at the data input terminal D. The input data signal SDATA is received at the clock terminal C and thus is used to clock the sequential state element 24. A memory input signal 38 is generated at the data output terminal Q so that the bit value stored by the sequential state element 24 is provided to memory outside of the decoder 10. As explained below, in other embodiments, the set of logical values that can be represented by the data pulses may be logical symbols. In this case, the data output 34 may have multiple data output signals in order to represent multiple bits. Thus, additional sequential state elements (not explicitly shown) may be provided to store the various bits.

As shown in FIG. 1, the comparison circuit 22 is provided as a subtractor that is configured to compare the first count parameter BIT_CNT with the reference parameter SYNC_CNT by subtracting the first count parameter BIT_CNT and the reference parameter SYNC_CNT. In this embodiment, the comparison circuit 22 is configured to subtract the first count parameter BIT_CNT from the reference parameter SYNC_CNT to determine a difference between the first count parameter BIT_CNT and the reference parameter SYNC_CNT. If the difference is positive, the comparison circuit 22 circuit generates the data output 34 to represent the first bit value (e.g., the bit value 1). If the difference is negative, the comparison circuit 22 circuit generates the data output 34 to represent the second bit value (e.g., the bit value 0).

As mentioned above, the counter enabling circuitry 16 is configured to enable the second counter 20 and disable the first counter 18 during a calibration time slot of the data frame and enable the first counter 18 and disable the second counter 20 during time slots of the data frame after the calibration time slot. To do this, the counter enabling circuitry 16 shown in FIG. 1 includes a modulo counter 40 and a logical network 42. The modulo counter 40 is operable to store a modulo counter parameter MOD_CNT and receive the input data signal SDATA at an input terminal 44. The modulo counter 40 is configured to increment the modulo counter parameter MOD_CNT in response to each of the data pulses defined by input data signal SDATA, including the calibration pulse and the other data pulses defined during the time slots of a data frame.

Since the modulo counter 40 is modulo, the modulo counter parameter MOD_CNT wraps around to cycle through an initial value to a final value and back to the initial value to cycle through the values again. The cycle can be set in accordance with the number of time slots provided in each data frame. For example, if the number of time slots in each data frame after the initial time slot is an integer N and the initial value is zero (0), then the modulo counter 40 can be configured to cycle the modulo counter parameter MOD_CNT between the initial value of zero (0) and the final value of N−1. Accordingly, the initial value (e.g., zero (0)) can be used to indicate the calibration time slot that has the calibration pulse. Any other one of the values in the cycle is for time slots after the calibration time slot. The final value of N−1 indicates that the last time slot in the data frame has been reached. If the modulo counter parameter MOD_CNT is incremented again after reaching the final value of N−1, the modulo counter parameter MOD_CNT wraps back around to the initial value of zero (0) and thereby indicates the calibration time slot for the next data frame. The initial value of zero (0) is thus a calibration number that indicates the calibration time slot of the data frame. In this manner, the counter enabling circuitry 16 allows the decoder 10 to be synchronized with the various data frames provided with the input data signal SDATA.

The logical network 42 is configured to disable the first counter 18 and enable the second counter 20 such that the second counter 20 counts the oscillation pulses if the modulo counter parameter MOD_CNT is equal to a calibration number (e.g. zero (0)). In this example, the logical network 42 is configured to generate an enabling signal 46 received at an enabling terminal 48 of the first counter 18 and generate an enabling signal 50 received at an enabling terminal 52 of the second counter 20. The logical network 42 generates the enabling signal 46 in a deactivation state, and the enabling signal 50 in an activation state if the modulo counter parameter MOD_CNT is equal to a calibration number (e.g. zero (0)). As such, the first counter 18 is disabled and the second counter is enabled during the calibration time slot. However, the logical network 42 is configured to enable the first counter 18 and disable the second counter 20 such that the first counter 18 counts the oscillation pulses if the modulo counter parameter MOD_CNT is not equal to the calibration number. Thus, the logical network 42 shown in FIG. 1 generates the enabling signal 46 in the activation state and the enabling signal 50 in the deactivation state when the modulo counter parameter MOD_CNT is equal to any value from 1 to N−1. As such, the first counter 18 is enabled and the second counter is disabled during the time slots that are provided after the calibration time slot.

Figure 2:
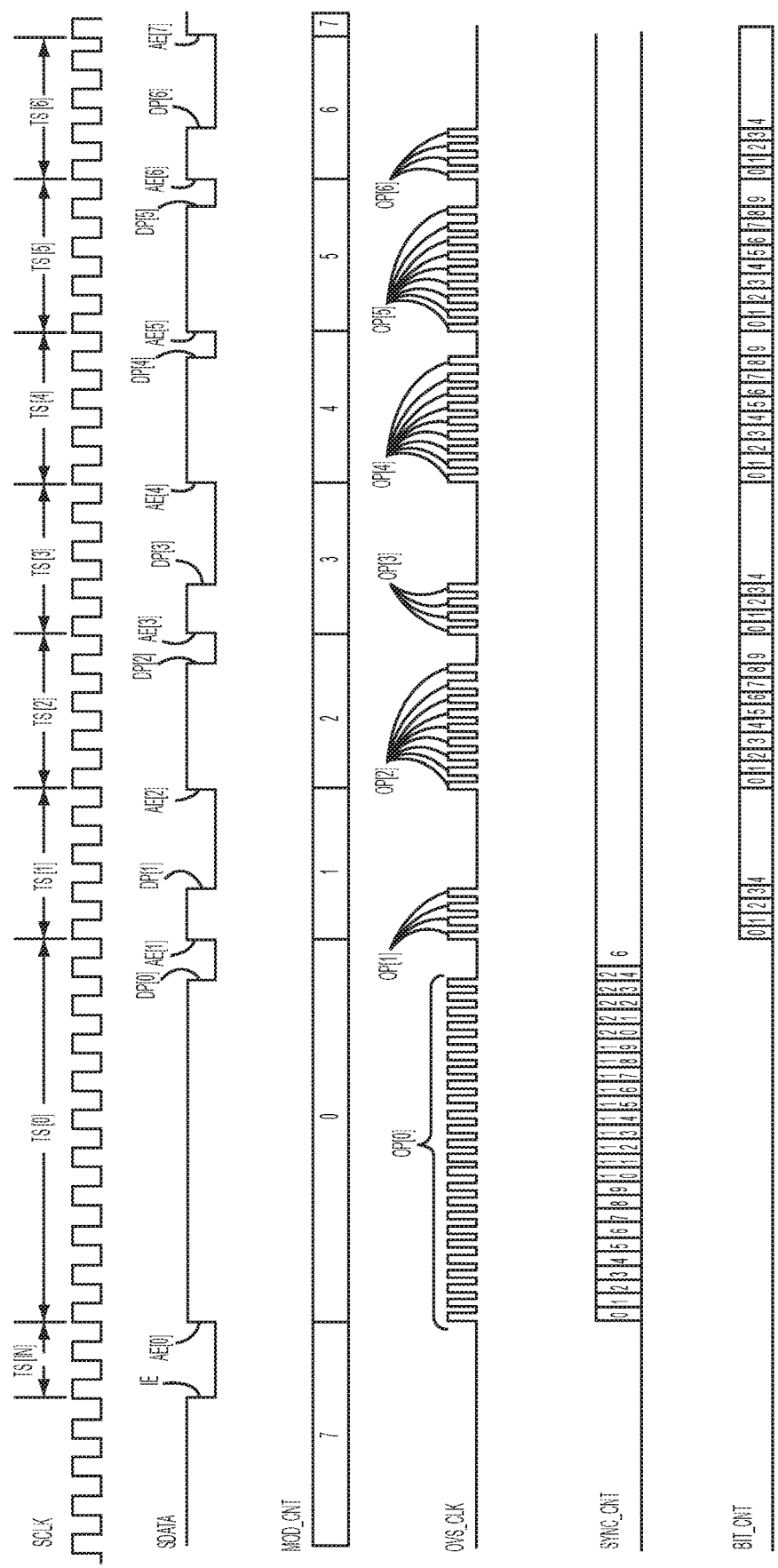
FIG. 2 illustrates a timing diagram for the decoder shown in FIG. 1 during an exemplary data frame provided in accordance to a one wire PWM bus protocol.

Referring now to FIG. 1 and FIG. 2, FIG. 2 illustrates a timing diagram for the decoder 10 shown in FIG. 1 during an exemplary data frame provided in accordance to a one wire PWM bus protocol. As shown in FIG. 2, the data frame in this example has eight time slots (referred to generally and generically as elements TS and specifically as elements TS[IN], and TS[0]-TS[6]). The timing diagram shown in FIG. 2 illustrates signal levels and parameter values for embodiments of a system clock signal SCLK, the input data signal SDATA, the modulo counter parameter MOD_CNT, the oscillator signal OVS_CLK, the reference parameter SYNC_CNT, and the first counter parameter BIT_CNT as a function of time during the time slots of the data frame. The system clock signal SCLK is ignored by the decoder 10 and is not provided at all to the decoder 10 shown in FIG. 1. However, the system clock signal SCLK may be utilized by outside circuitry (such as a master bus controller) to generate the input data signal SDATA, as explained in further detail below. The system clock signal SCLK is being shown here to help clarify the timing diagram with respect to system timing despite the decoder 10 not utilizing the system clock signal SCLK. As shown in FIG. 2, a time duration of each of the time slots TS[1]-TS[6] is approximately equal to four clock cycles. The time slots TS[1]-TS[6] are each standard time slots.

To begin the data frame, an initial time slot TS[IN] is provided where an initiating edge IE is provided. The initiating edge IE is a positive to negative edge where the input data signal SDATA is taken from high to low and from a charging state to a discharging state since the input data signal SDATA is provided in the charging state prior to the data frame during an idle time interval. The decoder 10 was deactivated during the idle time interval. However, the decoder 10 is activated in response to the initiating edge IE during the initial time slot TS[IN]. In this example, the initial time slot TS[IN] has a time duration equal to approximately 50% of a standard time slot.

The input data signal SDATA provided to the decoder 10 defines data pulses (referred to generally or generically as elements DP and specifically as elements DP[0] to DP[6]) during each of the time slots TS[0]-TS[6]. More specifically, a data pulse DP[0] is defined by the input data signal SDATA during a time slot TS[0]. This is the initial time slot, which is a calibration time slot. Thus, the data pulse DP[0] is a calibration data pulse. A time duration of the time slot TS[0] is approximately 250% a standard time duration of a standard time slot. A duty cycle of the input data signal SDATA during the calibration time slot TS[0] is 80%. Thus, the data pulse DP[0] is provided for 80% of the time slot TS[0] and has a temporal duration equal to eight clock cycles of the system clock signal SCLK. Accordingly, the time duration of the data pulse DP[0] is approximately equal to twice (200%) the standard time duration of a standard time slot.

The time slots TS[1]-TS[6] are each standard time slots and thus all have approximately the same time durations of four clock cycles of the system clock signal SCLK, which is referred to as the standard time duration of the standard time slot. The PWM bus protocol (i.e., also, the universal one-wire bus protocol) in this example uses one of the standard time slots to communicate a one-bit command. A data pulse DP[1] is defined by the input data signal SDATA during a time slot TS[1]. The time slot TS[1] is a command time slot and the data pulse DP[1] represents a command bit. A duty cycle of the data pulse DP[1] is 25%, and thus the data pulse DP[1] is provided for one quarter of the time slot TS[1] and has a temporal duration equal to one clock cycle of the system clock signal SCLK.

The PWM bus protocol in this example uses two of the time slots to communicate a two-bit bus address. A data pulse DP[2] is defined by the input data signal SDATA during a time slot TS[2]. The time slot TS[2] is a bus address time slot, and the data pulse DP[2] represents an address bit for a bus address. A duty cycle of the data pulse DP[2] is 75%, and thus the data pulse DP[2] is provided for 3 quarters of the time slot TS[2] and has a temporal duration equal to three clock cycles of the system clock signal SCLK. A data pulse DP[3] is defined by the input data signal SDATA during a time slot TS[3]. The time slot TS[3] is also an address time slot, and the data pulse DP[3] represents another address bit for the bus address. A duty cycle of the data pulse DP[3] is 25% and thus the data pulse DP[3] is provided for one quarter of the time slot TS[3] and has a temporal duration equal to one clock cycle of the system clock signal SCLK.

The PWM bus protocol in this example uses three of the time slots TS to communicate a three-bit payload. A data pulse DP[4] is defined by the input data signal SDATA during a time slot TS[4]. The time slot TS[4] is a payload time slot, and the data pulse DP[4] represents a first data bit for the three-bit data payload. A duty cycle of the data pulse DP[4] is 75%, and thus the data pulse DP[4] is provided for 3 quarters of the time slot TS[4] and has a temporal duration equal to three clock cycles of the system clock signal SCLK. A data pulse DP[5] is defined by the input data signal SDATA during a time slot TS[5]. The time slot TS[5] is another payload time slot, and the data pulse DP[5] represents a second data bit for the three-bit data payload. A duty cycle of the data pulse DP[5] is 75%, and thus the data pulse DP[5] is provided for 3 quarters of the time slot TS[5] and has a temporal duration equal to three clock cycles of the system clock signal SCLK. A data pulse DP[6] is defined by the input data signal SDATA during a time slot TS[6]. The time slot TS[6] is yet another payload time slot, and the data pulse DP[6] represents a third data bit for the three-bit data payload. A duty cycle of the data pulse DP[6] is 25%, and thus the data pulse DP[6] is provided for a quarter of the time slot TS[6] and has a temporal duration equal to one clock cycle of the system clock signal SCLK. At the end of the time slot TS[6], the data frame ends and thus the input data signal SDATA is held high in the charging state until the next data frame is to be decoded.

As shown in FIG. 2, the modulo counter parameter MOD_CNT is provided to equal the calibration number of zero (0) during the time slot TS[0], which is the calibration time slot. The counter enabling circuitry 16 is thus configured to enable the second counter 20 and disable the first counter 18. The oscillator 14 is configured to be enabled by the data pulse DP[0], which is the calibration pulse provided during the calibration time slot (i.e., TS[0]). The reference parameter SYNC_CNT of the second counter 20 is reset to an initial value of zero (0) by an activation edge AE[0] of the data pulse DP[0]. The second counter 20 is configured to count the oscillation pulses OP[0] defined by the oscillation signal OVR_CLK during the time slot TS[0] as a result of the data pulse DP[0] (the calibration pulse). More specifically, the second counter 20 is configured to increment the reference parameter SYNC_CNT as a result of each of the oscillation pulses OP[0] defined by the oscillation signal OVR_CLK during the time slot TS[0]. After the data pulse DP[0] is finished, the reference parameter SYNC_CNT is divided by four so that the reference parameter SYNC_CNT is equal to a reference number. In this example, the reference parameter SYNC_CNT is set equal to a reference number of six (6) as a result of the twenty four oscillation pulses OP[0] generated as a result of the data pulse DP[0] during the time slot TS[0]. As a result of the end of the data pulse DP[0], no more of the oscillation pulses OP[0] are generated, and the oscillation signal OVR_CLK is held in a deactivate state for a remainder of the time slot TS[0]. Accordingly, the reference parameter SYNC_CNT indicates the reference number of six (6), which is how many of the oscillation pulses OP[0] were generated by the oscillator 14 during the time slot TS[0] (i.e., the calibration time slot) as a result of the data pulse DP[0] (i.e., the calibration pulse) divided by a ratio, which is equal to four.

The modulo counter parameter MOD_CNT is provided to equal the number of one (1) during the time slot TS[1], which is the command time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[1], which is the command time slot. The first counter 18 may be configured to reset the first count parameter BIT_CNT to an initial value of zero (0) in response to an activation edge AE[1] of the data pulse DP[1]. The first counter 18 is configured to count the oscillation pulses OP[1] defined by the oscillation signal OVR_CLK during the time slot TS[1] as a result of the data pulse DP[1] (the command pulse), which had a 25% duty cycle.

More specifically, the first counter 18 is configured to increment the first count parameter BIT_CNT as a result of each of the oscillation pulses OP[1] defined by the oscillation signal OVR_CLK during the time slot TS[1]. In this example, the first count parameter BIT_CNT is set equal to a number of four (4) as a result of the four oscillation pulses OP[1] generated as a result of the data pulse DP[1] during the time slot TS[1]. As a result of the end of the data pulse DP[1], no more of the oscillation pulses OP[1] are generated and the oscillation signal OVS_CLK is held in a deactivate state for a remainder of the time slot TS[1]. Accordingly, the first count parameter BIT_CNT indicates a number of four (4), which is how many of the oscillation pulses OP[1] were generated by the oscillator 14 during the time slot TS[1] (i.e., the command time slot) as a result of the data pulse DP[1] (i.e., a command pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The command bit has thus been recovered in this case to equal the bit value of 0, which may indicate a write command. If the command bit had been a bit value of 1, this may have indicated a read command.

The modulo counter parameter MOD_CNT is provided to equal the number of two (2) during the time slot TS[2], which is a first address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[2], which is a first address time slot. The first counter 18 may be configured to reset the first count parameter BIT_CNT to an initial value of zero (0) in response to an activation edge AE[2] of the data pulse DP[2]. The first counter 18 is configured to count the oscillation pulses OP[2] defined by the oscillation signal OVR_CLK during the time slot TS[2] as a result of the data pulse DP[2] (i.e., a first address pulse), which has a 75% duty cycle.

More specifically, the first counter 18 is configured to increment the first count parameter BIT_CNT as a result of each of the oscillation pulses OP[2] defined by the oscillation signal OVR_CLK during the time slot TS[2]. In this example, the first count parameter BIT_CNT is set equal to a number of nine (9) as a result of the nine oscillation pulses OP[2] generated as a result of the data pulse DP[2] during the time slot TS[2]. As a result of the end of the data pulse DP[2], no more of the oscillation pulses OP[2] are generated, and the oscillation signal OVS_CLK is held in a deactivate state for a remainder of the time slot TS[2]. Accordingly, the first count parameter BIT_CNT indicates a number of nine (9), which is how many of the oscillation pulses OP[2] were generated by the oscillator 14 during the time slot TS[2] (i.e., the first address time slot) as a result of the data pulse DP[2] (i.e., the first address pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first address bit has thus been recovered in this case to equal a bit value of 1.

The modulo counter parameter MOD_CNT is provided to equal the number of three (3) during the time slot TS[3], which is a second address time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[3], which is a second address time slot. The first counter 18 may be configured to reset the first count parameter BIT_CNT to an initial value of zero (0) in response to an activation edge AE[3] of the data pulse DP[3]. The first counter 18 is configured to count the oscillation pulses OP[3] defined by the oscillation signal OVR_CLK during the time slot TS[3] as a result of the data pulse DP[3] (i.e., a second address pulse), which has a 25% duty cycle.

More specifically, the first counter 18 is configured to increment the first count parameter BIT_CNT as a result of each of the oscillation pulses OP[3] defined by the oscillation signal OVR_CLK during the time slot TS[3]. In this example, the first count parameter BIT_CNT is set equal to a number of four (4) as a result of the four oscillation pulses OP[3] generated as a result of the data pulse DP[3] during the time slot TS[3]. As a result of the end of the data pulse DP[3], no more of the oscillation pulses OP[3] are generated, and the oscillation signal OVS_CLK is held in a deactivate state for a remainder of the time slot TS[3]. Accordingly, the first count parameter BIT_CNT indicates a number of four (4), which is how many of the oscillation pulses OP[3] were generated by the oscillator 14 during the time slot TS[3] (i.e., the second address time slot) as a result of the data pulse DP[3] (i.e., the second address pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The second address bit has thus been recovered in this case to equal a bit value of 0.

The modulo counter parameter MOD_CNT is provided to equal a number of four (4) during the time slot TS[4], which is a first payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[4], which is the first payload time slot. The first counter 18 may be configured to reset the first count parameter BIT_CNT to an initial value of zero (0) in response to an activation edge AE[4] of the data pulse DP[4]. The first counter 18 is configured to count the oscillation pulses OP[4] defined by the oscillation signal OVR_CLK during the time slot TS[4] as a result of the data pulse DP[4] (i.e., a first payload pulse), which has a 75% duty cycle.

More specifically, the first counter 18 is configured to increment the first count parameter BIT_CNT as a result of each of the oscillation pulses OP[4] defined by the oscillation signal OVR_CLK during the time slot TS[4]. In this example, the first count parameter BIT_CNT is set equal to a number of nine (9) as a result of the nine oscillation pulses OP[4] generated as a result of the data pulse DP[4] during the time slot TS[4]. As a result of the end of the data pulse DP[4], no more of the oscillation pulses OP[4] are generated, and the oscillation signal OVS_CLK is held in a deactivate state for a remainder of the time slot TS[4]. Accordingly, the first count parameter BIT_CNT indicates a number of nine (9), which is how many of the oscillation pulses OP[4] were generated by the oscillator 14 during the time slot TS[4] (i.e., the first payload time slot) as a result of the data pulse DP[4] (i.e., the first payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The first payload bit has thus been recovered in this case to equal a bit value of 1.

The modulo counter parameter MOD_CNT is provided to equal the number of five (5) during the time slot TS[5], which is a second payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[5], which is the second payload time slot. The first counter 18 may be configured to reset the first count parameter BIT_CNT to an initial value of zero (0) in response to an activation edge AE[5] of the data pulse DP[5]. The first counter 18 is configured to count the oscillation pulses OP[5] defined by the oscillation signal OVR_CLK during the time slot TS[5] as a result of the data pulse DP[5] (i.e., a second payload pulse), which has a 75% duty cycle.

More specifically, the first counter 18 is configured to increment the first count parameter BIT_CNT as a result of each of the oscillation pulses OP[5] defined by the oscillation signal OVR_CLK during the time slot TS[5]. In this example, the first count parameter BIT_CNT is set equal to a number of nine (9) as a result of the nine oscillation pulses OP[5] generated as a result of the data pulse DP[5] during the time slot TS[5]. As a result of the end of the data pulse DP[5], no more of the oscillation pulses OP[5] are generated, and the oscillation signal OVS_CLK is held in a deactivate state for a remainder of the time slot TS[5]. Accordingly, the first count parameter BIT_CNT indicates a number of nine (9), which is how many of the oscillation pulses OP[5] were generated by the oscillator 14 during the time slot TS[5] (i.e., the second payload time slot) as a result of the data pulse DP[5] (i.e., the second payload pulse). The comparison circuit 22 then subtracts the reference parameter SYNC_CNT from the first count parameter BIT_CNT. Since nine (9) minus six (6) is positive, the comparison circuit 22 generates the data output 34 so that the data output 34 represents a bit value of 1. The second payload bit has thus been recovered in this case to equal a bit value of 1.

Also, the modulo counter parameter MOD_CNT is provided to equal a number of six (6) during the time slot TS[6], which is a third payload time slot. The counter enabling circuitry 16 is thus configured to enable the first counter 18 and disable the second counter 20. As such, the second counter 20 holds the reference parameter SYNC_CNT at the reference number of six (6). The oscillator 14 is configured to be enabled by the data pulse DP[6], which is the third payload time slot. The first counter 18 may be configured to reset the first count parameter BIT_CNT to an initial value of zero (0) in response to an activation edge AE[6] of the data pulse DP[6]. The first counter 18 is configured to count the oscillation pulses OP[6] defined by the oscillation signal OVR_CLK during the time slot TS[6] as a result of the data pulse DP[6] (i.e., a third payload pulse), which has a 25% duty cycle.

More specifically, the first counter 18 is configured to increment the first count parameter BIT_CNT as a result of each of the oscillation pulses OP[6] defined by the oscillation signal OVR_CLK during the time slot TS[6]. In this example, the first count parameter BIT_CNT is set equal to a number of four (4) as a result of the four oscillation pulses OP[6] generated as a result of the data pulse DP[6] during the time slot TS[6]. As a result of the end of the data pulse DP[6], no more of the oscillation pulses OP[6] are generated, and the oscillation signal OVS_CLK is held in a deactivate state for a remainder of the time slot TS[6]. Accordingly, the first count parameter BIT_CNT indicates a number of four (4), which is how many of the oscillation pulses OP[6] were generated by the oscillator 14 during the time slot TS[6] (i.e., the third payload time slot) as a result of the data pulse DP[6] (i.e., the third payload pulse). The comparison circuit 22 then subtracts the reference parameter SYNC_CNT from the first count parameter BIT_CNT. Since four (4) minus six (6) is negative, the comparison circuit 22 generates the data output 34 so that the data output 34 represents a bit value of 0. The third payload bit has thus been recovered in this case to equal a bit value of 0. Note that in this embodiment, the data pulses DP and oscillation pulses (referred to generally or generically as elements OP) are positive pulses. Other embodiments of the decoder 10 may be provided to operate with the data pulses DP and/or the oscillation pulses OP being negative pulses. For example, in another embodiment, the data pulses DP are negative pulses, while the oscillation pulses OP are positive pulses.

Finally, the modulo counter parameter MOD_CNT is provided to equal the number of seven (7) after the time slot TS[6], in response to an activation edge AE[7] when the input data signal SDATA is pulled high into the charging state. This sets up the modulo counter 40 so that in response to the next activation edge the modulo counter parameter MOD_CNT is initiated at zero in the next data frame. The counter enabling circuitry 16 is configured to deactivate the oscillator 14 so that the oscillator does not generate the oscillation pulses OP when the modulo counter parameter MOD_CNT is equal to 7. Thus, oscillation pulses OP is not generated during the time slot TS[7]. The second counter 20 may be configured to reset the reference parameter SYNC_CNT to an initial value of zero (0) in response to an activation edge AE[7] of input data signal SDATA. In this manner, the decoder 10 is set up for the next data frame. As such, when the first activation edge for the next data frame is provided, the modulo counter MOD_CNT is reset to its initial value of zero.

In the example described above in FIG. 2, the data pulse D[0] (i.e., the calibration data pulse) may be greater than the temporal duration of the time slots D[1]-D[6]. For example, the time slot TS[0] is four times as long as the temporal duration of the time slots TS[1]-TS[6]. Thus, in this case, the reference number may be equal to a quarter of the number of oscillation pulses OP[0] that were generated by the oscillator 14 during the calibration time slot. The second counter 20 is configured to divide the reference parameter SYNC_CNT by four to equal the reference number of a quarter of the number of the oscillation pulses OP[0] that were generated by the oscillator 14 during the time slot TS[0] (i.e., the calibration time slot). However in alternative embodiments, the time slot TS[0] may have the same temporal duration as the time slots TS[1]-TS[6] and the data pulse DP[0] may have a time duration of 50% of the time slot TS[0].

Figure 3:
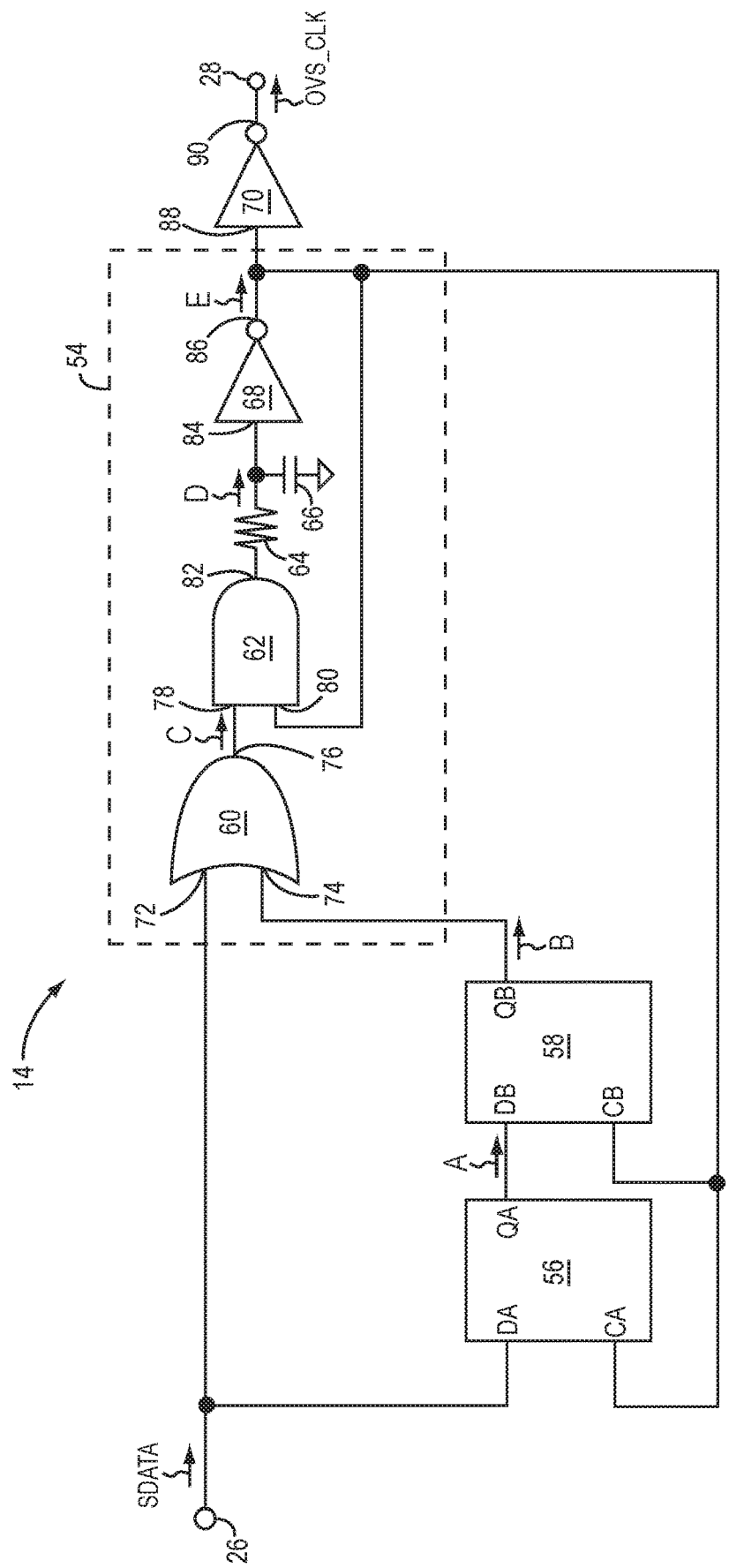
FIG. 3 illustrates one embodiment of an oscillator provided within the decoder shown in FIG. 1.

FIG. 3 illustrates one embodiment of the oscillator 14 provided within the decoder 10 shown in FIG. 1. The oscillator 14 includes a ring oscillator 54, a flip-flop 56, and a flip-flop 58. The ring oscillator 54 includes an OR gate 60, an AND gate 62, a resistor 64, a capacitor 66, and an inverter gate 68. An inverter gate 70 is connected to the inverter gate 68 of the ring oscillator 54. The input data signal SDATA is received at the enabling terminal 26. The oscillator 14 provides an asynchronous turn on and a synchronous turn off. An asynchronous turn on is acceptable because the normal state of this oscillator 14 is off. A synchronous turn off is used because data pulse edges on SDATA do not have a guaranteed phase.

The flip-flops 56, 58 are coupled sequentially with one another such that the flip-flops 56, 58 are configured to receive the input data signal SDATA and generate a delayed data signal B. More specifically, the flip-flop 56 includes a data terminal DA coupled to receive the data input signal SDATA, an output terminal QA, and a clock terminal CA. The flip-flop 58 includes a data terminal DB coupled to the output terminal QA, an output terminal QB, and a clock terminal CB. Flip-flop 56 generates a delayed data signal A from the data input signal SDATA, which is received by the flip-flop 58 at the data terminal DB. In response, the flip-flop 58 generates the delayed data signal B from the output terminal QB. In other embodiments, more flip-flops are provided in sequence with the flip-flops 56, 58 to provide an appropriate delay. The clock terminals CA, CB of the flip-flops 56, 58 are coupled to the ring oscillator 54 such that each of the flip-flops 56, 58 is clocked by the ring oscillator 54.

The OR gate 60 has an input terminal 72 coupled to receive the input data signal SDATA, an input terminal 74 coupled to the output terminal QB of the flip-flop 58, and an output terminal 76. The flip-flops 56, 58 are thus coupled to provide the delayed data signal B to the input terminal 74 of the OR gate 60. The OR gate 60 performs an OR operation on the input data signal SDATA and the delayed data signal B to generate an oscillator enable signal C at the output terminal 76.

The AND gate 62 has an input terminal 78 coupled to the output terminal 76 so as to receive the oscillator enable signal C, an input terminal 80 coupled to the ring oscillator 54, and an output terminal 82. The AND gate 62 thus gates the ring oscillator 54 and provides a feedback oscillator signal D from the output terminal 82. The resistor 64 and the capacitor 66 are used to provide a time constant for the ring oscillator 54. The feedback oscillator signal D is generated in accordance with the time constant set by the resistor 64 and capacitor 66 respectively. The inverter gate 68 has an input terminal 84 that receives the feedback oscillator signal D. The inverter gate 68 is an initial stage of the ring oscillator 54. The inverter gate 68 is configured to invert the feedback oscillator signal D and generate an intermediate oscillator signal E from an output terminal 86. The intermediate oscillator signal E is fed back to the input terminal 80 of the AND gate 62 and is provided to the clock terminals CA, CB to clock the flip-flops 56, 58. The AND gate 62 thus perform an AND operation on the intermediate oscillator signal E and the oscillator enable signal C to generate the feedback oscillator signal D. The intermediate oscillator signal E is provided to an input terminal 88 of the inverter gate 70. The inverter gate 70 is a buffer of the ring oscillator 54. The inverter gate 70 is configured to generate the oscillator signal OVS_CLK from an output terminal 90 of the inverter gate 70. The oscillator signal OVS_CLK is then output from the output terminal 28.

Figure 4:
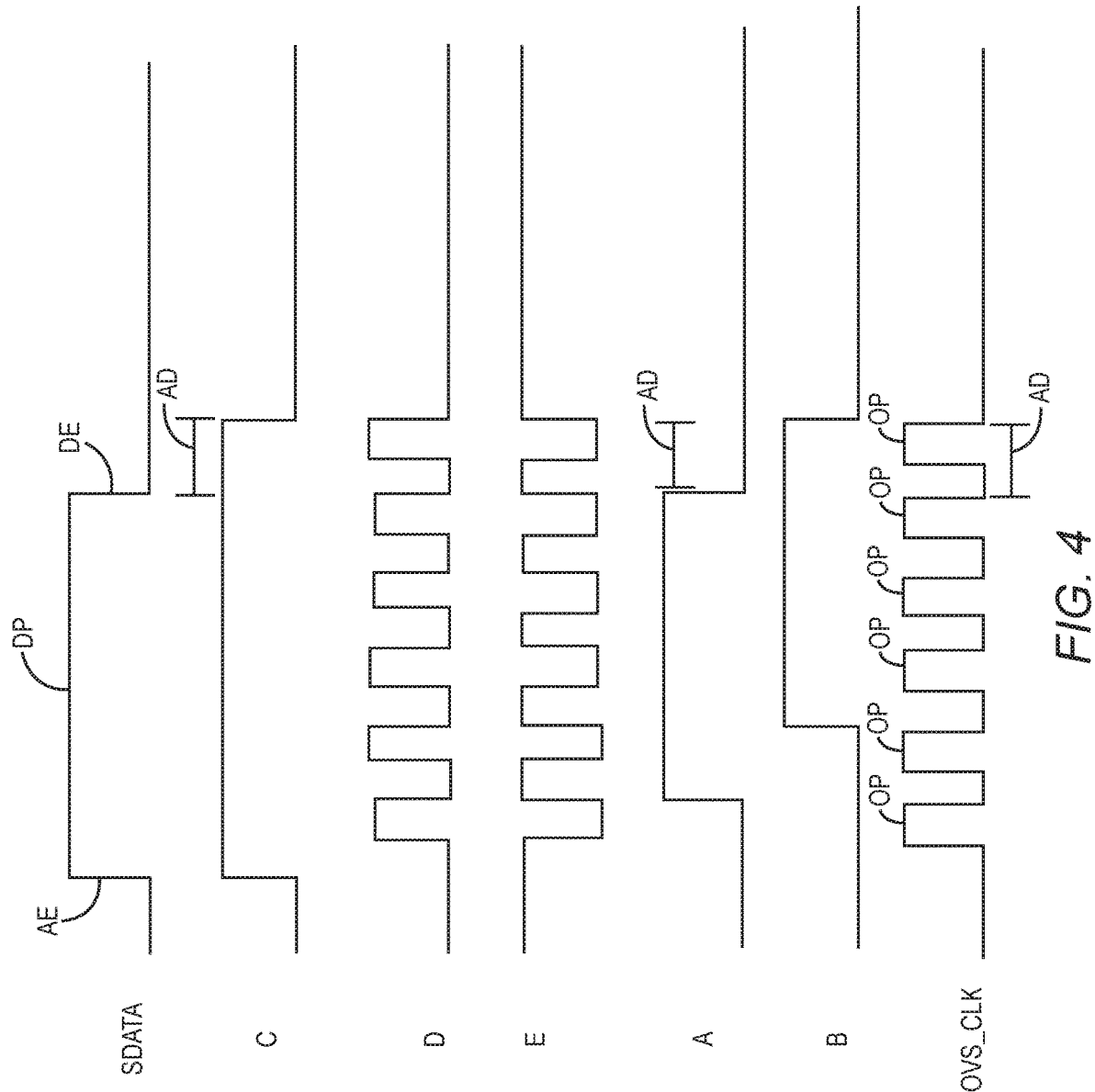
FIG. 4 illustrates an exemplary timing diagram for the oscillator shown in FIG. 3.

Referring now to FIG. 3 and FIG. 4, FIG. 4 illustrates an exemplary timing diagram for the oscillator 14 shown in FIG. 3. The operation of the oscillator 14 is demonstrated for the data pulse DP defined by the input data signal SDATA. Initially, when the input data signal SDATA is low, the capacitor 66 is discharged, and the feedback oscillator signal D is low while the intermediate oscillator signal E is high. At an activation edge AE of the data pulse DP and throughout the data pulse DP, the input terminal 72 of the OR gate 60 rises, and thus the oscillator enable signal C is provided in an activation state. Eventually the capacitor 66 charges enough so that the feedback oscillator signal D also is provided in an activation state. In response, the intermediate oscillator signal E goes low. As such, the capacitor 66 begins to discharge, and eventually the inverter gate 68 provides the intermediate oscillator signal E high. The inverter gate 70 then inverts the intermediate oscillator signal E to generate the oscillator signal OVS_CLK low. The process repeats so that, through the inverter gate 70, the ring oscillator 54 generates the oscillation pulses OP in the oscillation signal OVS_CLK. Note that any number of additional inverter gates may be provided in the ring oscillator 54 to provide an odd number of inversions.

By utilizing the OR gate 60, the input data signal SDATA provides a gated clock that activates and deactivates the ring oscillator 54. However, sampling errors can occur since the input data signal SDATA and the oscillator signal OVS_CLK are not frequency locked. The flip-flops 56, 58 synchronize the input data signal SDATA in accordance with the oscillator signal OVS_CLK and ensure that the oscillator 14 is cleanly deactivated. If the oscillation pulses OP of the oscillator signal OVR_CLK were being provided by sampling the input data signal SDATA, there would be a potential for counter errors on the activation edge AE and the deactivation edge DE of the data pulse DP defined by of the input data signal SDATA. The flip-flops 56, 58 hold the oscillator enable signal C high for a time delay AD to ensure proper synchronization.

After the deactivation edge DE, the delayed data signal A is delayed by the flip-flop 56, and the delayed data signal B has an additional delay due to the flip-flop 58. This provides the oscillator enable signal C in a high state for an additional period AD after the deactivation edge DE. Otherwise, if the OR gate 60 were not provided and the input data signal SDATA were provided directly into the input terminal 78 of the AND gate 62, a narrow glitch could occur in the feedback oscillator signal D. Also, in a worst case scenario without the OR gate, the activation edge AE or the deactivation edge DE of SDATA is provided during a positive edge of one of the oscillation pulses OP of the oscillation signal OVR_CLK. Since noise can shift the activation edge AE or the deactivation edge DE, this could cause a counter error. If both the activation edge AE and the deactivation edge DE shift, counter errors from 0-2 can result. The OR gate 60 and the flip-flops 56, 58 help ensure that the activation edge AE and the deactivation edge DE are appropriately aligned and that glitches do not occur in the oscillation signal OVR_CLK. In this manner, an appropriate number of the oscillation pulses OP are provided for the data pulse DP.

Figure 5:
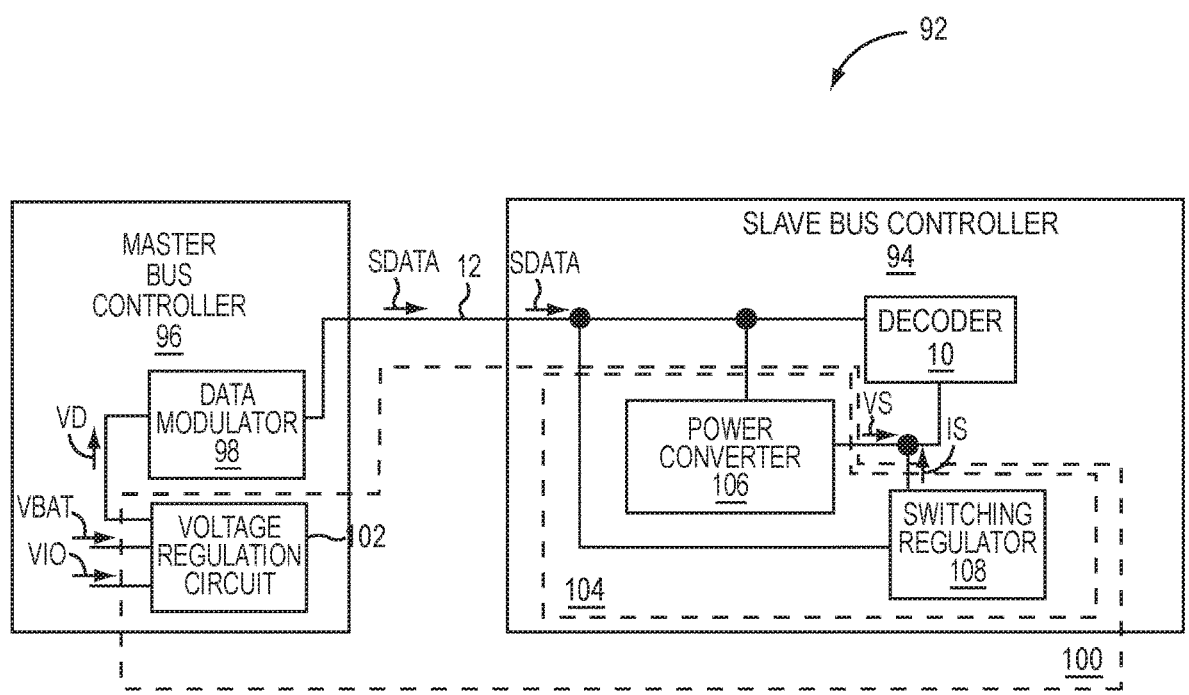
FIG. 5 illustrates an exemplary bus interface system having a slave bus controller, a master bus controller, and a bus line, where the slave bus controller includes power conversion circuitry to derive power from the input data signal transmitted along the bus line.

FIG. 5 illustrates an exemplary bus interface system 92 having a slave bus controller 94, a master bus controller 96, and the bus line 12. The slave bus controller 94 includes the decoder 10 described above with respect to FIG. 1. More specifically, the slave bus controller 94 is also coupled to the bus line 12 to receive the input data signal SDATA from the master bus controller 96. In this manner, the slave bus controller 94 can recover bits from the input data signal SDATA using the decoder 10 as described above with respect to FIGS. 1 and 2. The master bus controller 96 is coupled to the bus line 12 to provide the input data signal SDATA and transmit the input data signal SDATA along the bus line 12 to the slave bus controller 94. More specifically, the master bus controller 96 includes a data modulator 98 wherein the data modulator 98 is configured to generate the input data signal SDATA in accordance with the PWM bus protocol described above.

Furthermore, the bus interface system 92 includes a power management system 100 that may be provided in the bus interface system to distribute power from the master bus controller 96 to the slave bus controller 94. The master bus controller 96 includes the voltage regulation circuit 102, which is part of the power management system 100. The voltage regulation circuit 102 is configured to convert a power source voltage VBAT into a regulated supply voltage VD that powers the data modulator 98. As described above, the data modulator 98 is configured to generate the input data signal SDATA in accordance to a PWM bus protocol. For example, the data modulator 98 may be configured to provide the input data signal SDATA as shown in FIG. 2 or in accordance to any other description of the input data signal SDATA within the scope of this disclosure. In this example, the power source voltage VBAT is a battery voltage which is received by the master bus controller 96 from a battery. The voltage VIO is a control voltage that indicates a target supply voltage level for the supply voltage VD. The voltage regulation circuit 102 is operable to regulate the supply voltage VD so that the supply voltage VD is set to the target voltage level indicated by the control voltage VIO. The voltage regulation circuit 102 maintains the supply voltage VD approximately at the target supply voltage level indicated by the control voltage VIO despite fluctuations and irregularities in the power source voltage VBAT. In some embodiments, the voltage regulation circuit 102 may be a low drop out (LDO) voltage regulation circuit.

The slave bus controller 94 includes power conversion circuitry, which is part of the power conversion circuitry 104. The power conversion circuitry 104 that is configured to convert the input data signal SDATA into a supply voltage VS. The supply voltage VS may be utilized to power the decoder 10 (shown in FIG. 1) along with other circuitry in the slave bus controller 94. Note that in this embodiment of the bus interface system, no other bus line is provided to couple the master bus controller 96 to the slave bus controller 94. In the power conversion circuitry 104 shown in FIG. 5, the power conversion circuitry 104 includes a power converter 106. The power converter 106 is coupled to the bus line 12 and is configured to convert the input data signal SDATA into the supply voltage VS. Accordingly, the power converter 106 is a PWM to DC power converter since the power converter 106 is configured to convert the input data signal SDATA formatted in accordance with the PWM bus protocol described above into the supply voltage VS. Thus, only the bus line 12 is provided to couple the master bus controller 96 to the slave bus controller 94.

To prevent the supply voltage VS from drooping however, particularly when the input data signal SDATA is in a discharging state during a data frame, the power conversion circuitry 104 is further configured to regulate the first supply voltage VS with a charge current IS. Again, since the PWM bus protocol is a one wire bus protocol and no other bus line besides the bus line 12 couples the slave bus controller 94 and the master bus controller 96, the power conversion circuitry 104 is configured to generate the charge current IS from the input data signal SDATA. The supply voltage VS is thus also a regulated supply voltage. In this embodiment however, the power converter 106 is not configured to regulate the supply voltage VS or to generate the charge current IS. Instead, the power conversion circuitry 104 includes the switching regulator 108. The switching regulator 108 is configured to regulate the first supply voltage with the charge current IS. The switching regulator 108 is switchable so as to generate the charge current IS from the first input data signal SDATA. By utilizing both the power converter 106 and the switching regulator 108, the power conversion circuitry 104 can prevent the supply voltage VS from drooping excessively but allow the supply voltage VS to be charged up faster without causing the supply voltage VS to become overcharged.

FIG. 6 illustrates another exemplary embodiment of the bus interface system 92 that includes exemplary embodiments of the slave bus controller 94 and the master bus controller 96. The master bus controller 96 is coupled to the bus line 12 to provide the input data signal SDATA and transmit the input data signal SDATA along the bus line 12 to the slave bus controller 94. The slave bus controller 94 is also coupled to the bus line 12 to receive the input data signal SDATA from the master bus controller 96. The slave bus controller 94 includes the decoder 10 to decode the input data signal SDATA in accordance with the PWM bus protocol described above in FIG. 2.

The bus interface system 92 includes the power management system 100 shown in FIG. 5. Thus, the master bus controller 96 includes the voltage regulation circuit 102, which is part of the power management system 100. The power management system 100 is provided in the bus interface system 92 to distribute power from the master bus controller 96 to the slave bus controller 94. The master bus controller 96 includes a voltage regulation circuit 102, which is part of the power management system 100. As explained above, the voltage regulation circuit 102 is configured to convert the power source voltage VBAT into the regulated supply voltage VD that powers the data modulator 98.

The slave bus controller 94 is also coupled to the bus line 12 to receive the input data signal SDATA from the master bus controller 96. The slave bus controller 94 includes power conversion circuitry 104 which is an embodiment of the power conversion circuitry 104 discussed above, with respect to FIG. 6. The power conversion circuitry 104 that is configured to convert the input data signal SDATA into the supply voltage VS. In this manner, the decoder 10 is configured to be powered by the supply voltage VS. In particular, the oscillator 14 is configured to be powered by the supply voltage VS. As such, the power to generate the oscillation signal OVR_CLK is delivered by the supply voltage VS to the oscillator 14. As explained above, the power conversion circuitry 104 is configured to generate the charge current IS from the input data signal SDATA to regulate the supply voltage VS with the charge current IS. As such, the supply voltage VS is a regulated supply voltage. Furthermore, the power conversion circuitry 104 is configured to generate the charge current IS from the input data signal SDATA.

In this embodiment, the master bus controller 96 is a bridge bus controller that translates a data frame formatted in accordance with a first bus protocol into the data pulses DP (shown in FIG. 2) defined by the input data signal SDATA during the time slots TS (shown in FIG. 2) of the data frame formatted in accordance with the PWM bus protocol. Additionally, in this embodiment, the master bus controller 96 is configured to translate the payload and the bus address represented by a data frame formatted in accordance with a Mobile Industry Processor Interface (MIPI) bus protocol and translate the payload and the bus address represented by the data frame into the data pulses DP (shown in FIG. 2) defined by the input data signal SDATA during the time slots TS (shown in FIG. 2) of the data frame formatted in accordance with the PWM bus protocol.

The master bus controller 96 shown in FIG. 6 includes a MIPI Radio Frequency Front End (RFFE) state machine 124, a data modulator 98, an oscillator calibration circuit 112, a ring oscillator 114, and a bidirectional buffer 116. In this embodiment, the oscillator calibration circuit 112 is provided in the data modulator 98. The MIPI RFFE state machine 110 is configured to receive a first bus input, which in this example is a data input signal MDATA formatted in accordance with the MIPI bus protocol. The data input signal MDATA is received on a bus line 118. The data input signal MDATA represents a data frame that includes a bus address and a payload formatted in accordance with the MIPI bus protocol. To synchronize the master bus controller 96, the master bus controller 96 also receives the system clock signal SCLK on a bus line 120. Furthermore, the master bus controller 96 receives a supply voltage VIO along a bus line 122. The MIPI RFFE state machine is configured to extract the bus address and the payload from the data frame represented using the input data signal MDATA and generate a digital output 124' that transfers the bus address and the payload to the data modulator 98. The data modulator 98 is configured to obtain the bus address and payload extracted from the data input signal MDATA and provide the bus address and payload to a data frame formatted in accordance with the PWM bus protocol. The data modulator 98 is synchronized using the ring oscillator 114, which in this example is a digitally controlled oscillator (DCO). The ring oscillator 114 is configured to generate an oscillator signal 126. The ring oscillator 114 is relatively inexpensive. The oscillator calibration circuit is configured to calibrate the ring oscillator 114 based on the system clock signal SCLK. In this embodiment, the MIPI RFFE state machine 110 is configured to generate a calibration clock signal SCLK' by dividing down the system clock signal SCLK. The oscillator calibration circuit 112 is operable to receive the calibration clock signal SCLK' and generate a control output 128 that synchronizes the oscillator signal 126 in accordance with the calibration clock signal SCLK'.

The data modulator 98 is operable to receive the oscillator signal 126 and is configured to generate the input data signal SDATA such that the data pulses DP (shown in FIG. 2) of the input data signal SDATA are synchronized by the oscillator signal 126. Since the oscillator signal 126 was synchronized based on the system clock signal SCLK (e.g., in this embodiment, in accordance with the calibration clock signal SCLK' generated from the system clock signal SCLK), the timing accuracy of the oscillator signal 126 is maintained. As shown in FIG. 6, the bidirectional buffer 116 has an input terminal 130 that receives the SDATA signal and an output terminal 132 that provides the input data signal SDATA to the bus line 12. The output terminal 132 is coupled to the bus line 12, which is connected to the slave bus controller 94. However, the bidirectional buffer 116 also includes an input terminal 134 that is operable to receive an enable signal MEN. When the enable signal MEN is in an activated state, the bidirectional buffer 116 is configured to transmit the input data signal SDATA along the bus line 12. Otherwise, when the enable signal MEN is in a deactivation state, the bidirectional buffer 116 does not transmit the input data signal SDATA along the bus line 12 but rather allows the master bus controller 96 to receive data signals from slave controllers connected to the bus line 12. The enabling signal MEN may be generated by the data modulator 98 and may activate the bidirectional buffer 116 when the slave bus controller 94 is not pulling down the bus line 12. Since the slave bus controller 94 is synchronized with the data pulse DP[0] (i.e., the calibration pulse), and the power conversion circuitry 104 converts the input data signal SDATA into the supply voltage VS, the master bus controller 96 and the slave bus controller 94 are only connected by the bus line 12. No other bus lines are needed.

FIG. 7 illustrates one exemplary embodiment of a power management system 100A, along with ancillary circuitry. The power management system 100A is an example of the power management system 100 described above with respect to FIGS. 5 and 6. Accordingly, the power management system 100A may be provided in the bus interface system 92 shown in FIG. 5 and FIG. 6.

The power management system 100A is provided in the bus interface system 92 to distribute power from the master bus controller 96 to the slave bus controller 94. In accordance with a PWM bus protocol (such as the PWM bus protocols described above), the master bus controller 96 is configured to generate the input data signal SDATA and to transmit the input data signal SDATA along the bus line 12 to the slave bus controller 94. No other bus line is provided to couple the master bus controller 96 to the slave bus controller 94.

Again, as described above, the slave bus controller 94 is coupled to the bus line 12 so as to receive the input data signal SDATA from the master bus controller 96. The slave bus controller 94 includes an embodiment of the power conversion circuitry 104A. The power conversion circuitry 104A is configured to convert the input data signal SDATA into a supply voltage VS. The power conversion circuitry 104A shown in FIG. 7 is part of the power management system 100A that is provided in the slave bus controller 94. The supply voltage VS may be utilized to power the decoder 10 (shown in FIGS. 5 and 6) along with other circuitry in the slave bus controller 94.

In FIG. 7, the master bus controller 96 includes the voltage regulation circuit 102, which are part of the power management system 100A. The voltage regulation circuit 102 is configured to convert the power source voltage VBAT into the regulated supply voltage VD that powers the data modulator 98. As described above, the data modulator 98 is configured to generate the input data signal SDATA in accordance to a PWM bus protocol. For example, the data modulator 98 may be configured to provide the input data signal SDATA as shown in FIG. 2 or in accordance to any other description of the input data signal SDATA within the scope of this disclosure. The voltage regulation circuit 102 may be any kind of circuit configured to convert the power source voltage VBAT into the supply voltage VD. In some embodiments, the voltage regulation circuit 102 may be a low drop out (LDO) converter.

In this example, the power source voltage VBAT is a battery voltage which is received by the master bus controller 96 from a battery. The voltage VIO is a control voltage that indicates a target supply voltage level for the supply voltage VD. The voltage regulation circuit 102 is operable to regulate the supply voltage VD so that the supply voltage VD is set to the target voltage level indicated by the control voltage VIO. The voltage regulation circuit 102 maintains the supply voltage VD approximately at the target supply voltage level indicated by the control voltage VIO despite fluctuations and irregularities in the power source voltage VBAT. The power management system 100A uses the control voltage VIO as a bus reference voltage. Alternatively, a bandgap circuit can be provided in the master bus controller 96 that provides a reference voltage that is independent of the power source voltage VBAT. The reference voltage can then be used to regulate the supply voltage VD generated by the voltage regulation circuit 102. In this case, the voltage regulation circuit 102 is configured to generate the supply voltage VD between 2.5V to 2.9V. When the control voltage VIO is used, some embodiments of the voltage regulation circuit 102 have generated the supply voltage VD at 1.8V.

In FIG. 7, the supply voltage VD powers the data modulator 98. As described above, the data modulator 98 is configured to generate the input data signal SDATA in accordance to a PWM bus protocol. In this embodiment, the data modulator 98 includes a P-channel field effect transistor (PFET) FETM1 and an N-channel field effect transistor (NFET) FETM2. The supply voltage VD is received from the voltage regulation circuit 102 at a supply terminal 136. The PFET FETM1 includes a drain DPM1, a source SPM1, and a gate GPM1 while the NFET FETM2 includes a drain DNM1, a source SNM1, and a gate GNM1. The source SPM1 of the PFET FETM1 is coupled to the supply terminal 136 to receive the supply voltage VD from the voltage regulation circuit 102. The drain DPM1 of the PFET FETM1 is connected to the bus line 12 at a node PP. The gate GPM1 of the NFET FETM1 is operable to receive a control voltage WV1 from the data modulator 98. The drain DNM1 of the NFET FETM2 is coupled to the bus line 12 at the node PP. The source SNM1 of the NFET FETM2 is connected to ground. The gate GNM1 of the NFET FETM2 is also coupled to receive the control voltage WV1.

In this embodiment, the input data signal SDATA is an input signal voltage. When the control voltage WV1 is generated by the data modulator 98 to be low (which is the activation state for the PFET FETM1 and the deactivation state for the NFET FETM2), the NFET FETM2 is turned off, and the PFET FETM1 pulls the bus line 12 at node PP near the supply voltage VD. Accordingly, the input data signal SDATA is provided high (i.e., the charging state) and in an activation state. The data modulator 98 is configured to operate the PFET FETM1 in an ohmic region when the control voltage WV1 is generated by the data modulator 98 to be low. Thus, after switching transients have subsided, the PFET FETM1 presents a resistance to the bus line 12. In one example, the PFET FETM1 presents a resistance of approximately 20 ohms to the bus line 12 at the node PP when the control voltage WV1 is low (and after switching transients have subsided).

On the other hand, when the control voltage WV1 is high (which is the deactivation state for the PFET FETM1 and the activation state for the NFET FETM2), the PFET FETM1 is turned off and the NFET FETM2 pushes the bus line 12 down near ground. Accordingly, the input data signal SDATA is provided low (i.e., the discharge state) and in a deactivation state. The data modulator 98 is configured to operate the NFET FETM2 in an ohmic region when the control voltage WV1 is generated by the data modulator 98 to be high. Thus, after switching transients have subsided, the NFET FETM2 presents a resistance to the bus line 12. In one example, the NFET FETM2 presents a resistance of approximately 20 ohms to the bus line 12 at the node PP when the control voltage WV1 is high (and after switching transients have subsided).

The slave bus controller 94 includes power conversion circuitry 104A, which is part of the power management system 100A. The power conversion circuitry 104A is an embodiment of the power conversion circuitry 104 shown in FIGS. 5 and 104A shown in FIG. 6. The power conversion circuitry 104A shown in FIG. 7 includes a power converter 106A. The power converter 106A is coupled to the bus line 12 and is configured to convert the input data signal SDATA into the supply voltage VS. The power conversion circuitry 104A is configured to convert the input data signal SDATA into a supply voltage VS. The supply voltage VS may be utilized to power the decoder 10 (shown in FIGS. 1 and 6) along with other circuitry in the slave bus controller 94. Note that in this embodiment of the bus interface system 92, no other bus line is provided to couple the master bus controller 96 to the slave bus controller 94. Accordingly, the power converter 106A is a PWM to DC power converter since the power converter 106A is configured to convert the input data signal SDATA formatted in accordance with the PWM bus protocol described above into the supply voltage VS. Thus, only the bus line 12 is provided to couple the master bus controller 96 to the slave bus controller 94.

The power converter 106A includes a reservoir capacitor CRES1 coupled to generate the supply voltage VS. The power converter 106A further includes a rectifier D1 coupled between the bus line 12 and the reservoir capacitor CRES1 so that the rectifier D1 charges the reservoir capacitor CRES1 with the input data signal SDATA and so that the rectifier D1 blocks discharge from the reservoir capacitor CRES1.

The power converter 106A also includes a first switchable bypass path 138 and a second switchable bypass path 140. Both the first switchable bypass path 138 and the second switchable bypass path 140 are coupled between the bus line 12 and the reservoir capacitor CRES1 such that the first switchable bypass path 138 and the second switchable bypass path 140 are each coupled to bypass the rectifier D1. The first switchable bypass path 138 is switchable to be opened and closed. Similarly, the second switchable bypass path 140 is also switchable to be opened and closed. As shown in FIG. 7, the power converter 106A receives the input data signal SDATA at an input terminal PCI coupled to the bus line 12. The input terminal PCI is coupled to an input node of the power converter 106A.

In this embodiment, the rectifier D1 is provided by a diode connected in series within a charging path 142 between the input terminal PCI and the reservoir capacitor CRES1. The rectifier D1, which in this case is a diode, is forward-biased so that charge can flow into the reservoir capacitor CRES1. The rectifier D1 is also connected so that any discharge of the reservoir capacitor CRES1 is blocked by the rectifier D1. As such, the rectifier D1 in this embodiment is a half-wave rectifier. All that is required by the rectifier D1 is that the rectifier D1 charges the reservoir capacitor CRES1 with the input data signal SDATA, but that discharge from the reservoir capacitor CRES1 be blocked by the rectifier D1. Thus, while input data signal SDATA is high and in a charging state, the rectifier D1 is coupled to transfer a charge into the reservoir capacitor CRES1 so that the reservoir capacitor CRES1 generates the supply voltage VS. However, while the input data signal SDATA is low, and thus in a discharging state, the rectifier D1 is coupled to block the discharge of the reservoir capacitor CRES1 in order to maintain the supply voltage level of the supply voltage VS relatively steady.

One of the problems with the rectifier D1 is that it requires a turn on voltage before the rectifier D1 is capable of charging the reservoir capacitor CRES1 with the input data signal SDATA. Accordingly, the first switchable bypass path 138 and the second switchable bypass path 140 are provided to increase the speed at which the reservoir capacitor CRES1 is charged, as is explained in further detail below. In this embodiment, the second switchable bypass path 140 is coupled between the input terminal PCI and the reservoir capacitor CRES1 such that the second switchable bypass path 140 is coupled to bypass the rectifier D1. More specifically, the second switchable bypass path 140 shown in FIG. 7 is coupled in parallel with the rectifier D1 and thus provides an alternate charging path. The second switchable bypass path 140 is switchable to be opened and closed.

In this embodiment, the power converter 106A includes a capacitor CD1A coupled in shunt to the bus line 12 at the input node connected to the input terminal PCI of the slave bus controller 94. The capacitor CD1A is a noise and suppression capacitor that is sized to filter out noise and suppress voltage and current spikes along the charging path 142. In one embodiment, the capacitor CD1A has a capacitance of approximately 20 picofarads. In this embodiment, the rectifier D1 is provided by a diode connected in series within the charging path 142 between the input terminal PCI and the reservoir capacitor CRES1. The rectifier D1, which in this case is a diode, is forward-biased so that charge can flow into the reservoir capacitor CRES1. The rectifier D1 is also connected so that any discharge of the reservoir capacitor CRES1 is blocked by the rectifier D1. As such, the rectifier D1 in this embodiment is a half-wave rectifier. All that is required by the rectifier D1 is that the rectifier D1 charges the reservoir capacitor CRES1 with the input data signal SDATA, but that discharge from the reservoir capacitor CRES1 be blocked by the rectifier D1. Thus, while input data signal SDATA is high and in a charging state, the rectifier D1 is coupled to transfer a charge into the reservoir capacitor CRES1 so that the reservoir capacitor CRES1 generates the supply voltage VS. However, while the input data signal SDATA is low, and thus in a discharging state, the rectifier D1 is coupled to block the discharge of the reservoir capacitor CRES1 in order to maintain the supply voltage level of the supply voltage VS relatively steady.

Furthermore, the second switchable bypass path 140 includes a resistor 144 coupled in series within the second switchable bypass path 140. The first switchable bypass path 138 is connected to the second switchable bypass path 140 such that the first switchable bypass path 138 is coupled to bypass the resistor 144 in the second switchable bypass path 140. More specifically, the first switchable bypass path 138 includes a switch S1 coupled in series within the first switchable bypass path 138. Thus, when the switch S1 is open, the first switchable bypass path 138 is open, and when switch S1 is closed, the first switchable bypass path 138 is closed. The second switchable bypass path 140 also includes a switch S2 coupled in series within the second switchable bypass path 140. Thus when the switch S2 is open, the second switchable bypass path 140 is open, and when the switch S2 is closed, the second switchable bypass path 140 is closed.

In this embodiment, the power conversion circuitry 104A includes control circuitry 146. The control circuitry 146 is configured to generate a control output 148 to open and close the switches S1, S2. For example, the control output 148 may include a switch control signal CS1 that is received by the switch S1. When the switch control signal CS1 is in a first state, the switch S1 is open. However, while the switch control signal CS1 is in a second state, the switch S1 is closed. Similarly, the control output 148 may include a switch control signal CS2. When the switch control signal CS2 is in a first state, the switch S2 may be open. However, when the switch control signal CS2 is in a second state, the switch S2 may be closed. In this manner, the control circuitry 146 is operable to generate the control output 148 so as to open and close the switches S1 and S2.

With respect to the master bus controller 96, in addition to the voltage regulation circuit 102, the power management system 100A includes a capacitor CBPA coupled in shunt between the voltage regulation circuit 102 and the supply terminal 136. The capacitor CBPA helps reduce ripple variations and decouples the voltage regulation circuit 102 from any input data signals transmitted along the bus line from the slave bus controller 94 to the master bus controller 96. In addition, the power management system 100A includes a master switchable bypass path 150 which is included in the master bus controller 96. The master switchable bypass path 150 is switchable to be opened and to be closed. More specifically, the master switchable bypass path 150 includes a switch SM that is coupled in series within the master switchable bypass path 150. In this embodiment, the master switchable bypass path 150 only includes a switch and does not include a resistor. The switch SM is configured to be opened and closed thereby opening and closing the master switchable bypass path 150.

As shown in FIG. 7, the master bus controller 96 includes control circuitry 152. Control circuitry 152 is configured to generate a control output 154. The control output 154 includes a control signal CSG that is received by the switch SM in the master switchable bypass path 150. When the control signal CSM is generated by the control circuitry 152 in a first state, the switch SM and therefore the master switchable bypass path 150 is open. On the other hand, when the control signal CSM is generated by the control circuitry 152 in a second state, the switch SM and therefore the master switchable bypass path 150 is closed. In this manner, the control circuitry 152 is operable to open and close the switch SM. The master switchable bypass path 150 is connected between the voltage regulation circuit 102 and the bus line 12 so as to bypass the data modulator 98. In this embodiment, the master switchable bypass path 150 is connected from the drain DPM1 of the PFET FETM1 to the source SPM1 of the PFET FETM1. Thus, when the master switchable bypass path 150 is closed, the voltage drop across the PFET FETM1 is bypassed, and the first input data signal SDATA is generated to have a voltage level approximately at a voltage level of the supply voltage VD generated by the voltage regulation circuit 102.

In addition, the power converter 106A shown in FIG. 7 also includes a diode D2 and another reservoir capacitor CRES2. The diode D2 is coupled between the reservoir capacitor CRES1 and the reservoir capacitor CRES2 such that the reservoir capacitor CRES2 is configured to generate a supply voltage VSD that is below the supply voltage VS. More specifically, the diode D2 is forward biased from the reservoir capacitor CRES1 to the reservoir capacitor CRES2. Thus there is a voltage drop from the reservoir capacitor CRES1 to the reservoir capacitor CRES2 equal approximately to the turn on voltage of the diode D2. In this embodiment, the supply voltage VSD is approximately 0.7 V below the supply voltage VS. The supply voltage VSD is used as a digital supply voltage in order to power digital components within the slave bus controller 94.

Referring now to FIG. 2 and FIG. 7, the switches S1 and S2 may be opened and closed by the power conversion circuitry 104A in three different configurations depending on where in the data frame the input data signal SDATA is being provided. The master bus controller 96 is configured to hold the input data signal SDATA in a charging state (i.e., the input data signal SDATA is high) during a communication interlude between the master bus controller 96 and the slave bus controller 94. In this example, the communication interlude is provided after the activation edge AE[7] that ends the data frame but before the next data frame is initiated. In other words, at the activation edge AE[7], the timeslots TS[0]-TS[6] that include the data pulses DP[0]-DP[6] of the data frame have finished. Also, at startup, prior to the first data frame transmitted by the master bus controller 96 to the slave bus controller 94, the master bus controller 96 is configured to hold the input data signal SDATA in the charging state after the power management system 100A has been fully turned on. Thus, during a communication interlude, the master bus controller 96 and the slave bus controller 94 are in a communication interlude while data pulses DP are not being provided during a communication session. Instead, the master bus controller 96 is configured simply to hold the input data signal SDATA in the charging state (e.g., in a high state). Thus, after a charging time interval (which is explained in further detail below), and before the initiation of the next data frame, the first switchable bypass path 138 and the second switchable bypass path 140 are switched in accordance with an idling switch state of the power management system 100A.

More specifically, during the idling switch state of the power management system 100A, the control circuitry 146 is configured to provide the first switchable bypass path 138 such that the first switchable bypass path 138 is open and provide the second switchable bypass path 140 such that the second switchable bypass path is closed. Thus, during the idling switch state of the power management system 100A, the reservoir capacitor CRES1 is charged by a charge current provided through the second switchable bypass path 140 to the reservoir capacitor CRES1. Note that since the input data signal SDATA is simply being held in the charging state (the high state) by the master bus controller 96, rectification by the rectifier D1 is not needed, and thus the rectifier D1 is bypassed. However, the first switchable bypass path 138 is open, and thus no discharge current can flow through the first switchable bypass path 138. However, the problems with the turn on voltage of the rectifier D1 are obviated during the idling switch state of the power management system 100A because the reservoir capacitor CRES1 is charged with the input data signal SDATA through the second switchable bypass path 140, which is closed.

As shown in FIG. 7, the power conversion circuitry 104A includes a switching regulator 108A. This switching regulator 108A is an embodiment of the switching regulator 108 shown in FIG. 5. The switching regulator 108A is thus configured to generate the charge current IS from the input data signal SDATA transmitted along the bus line 12 by the data modulator 98 of the master bus controller 96 in accordance with the PWM bus protocol. The switching regulator 108A is coupled to charge the reservoir capacitor CRES1 with the charge current IS. The switching regulator 108A is configured to generate the charge current IS such that the charge current IS regulates the supply voltage VS by charging the reservoir capacitor CRES1.

In this embodiment, the switching regulator 108A is a switch regulated capacitive flyback converter 108A. Thus, the switch regulated capacitive flyback converter 108A is switchable to generate the charge current IS by storing and releasing charge from the input data signal SDATA while the data signal SDATA is in the charging state (i.e., while bus line 12 is high). Accordingly, the switch regulated capacitive flyback converter 108A is configured to generate the charge current IS as a pulsed charge current.

As shown in FIG. 7, the switch regulated capacitive flyback converter 108A includes a switchable charging path 158P connected between the bus line 12 and the reservoir capacitor CRES1. In this embodiment, the switchable charging path 158P is connected between the node BSP and the node SSP. The node BSP is connected to the input terminal PCI and the input terminal PCI is connected to the bus line 12. The node SSP is connected to the reservoir capacitor CRES. The switchable charging path 158P includes a diode 160P and a switch PWP, which in this example is a PFET.

The diode 160P is connected in series within the switchable charging path 158P between the node BSP and a node NWP, which is coupled through the switch PWP to the reservoir capacitor. As such, an anode of the diode 160P is connected to receive charge from the bus line 12 while the cathode of the diode 160P is connected to the node NWP and thus is coupled to transmit that charge toward the reservoir capacitor CRES1. As shown in FIG. 7, the diode 160P is connected so that the forward current direction of the diode 160P is from the bus line 12 toward the reservoir capacitor CRES1. Accordingly, the diode 160P transmits charge from the bus line 12 to the reservoir capacitor CRES1 but blocks charge from being transmitted through the switchable charging path 158P towards the bus line 12. Accordingly, the diode 160P is configured to transmit a charge current 162P generated from the input data signal SDATA while the input data signal SDATA is high and in the charging state.

In this manner, as a result of the diode 160P, the switchable charging path 158P is configured to unilaterally conduct charge toward the reservoir capacitor CRES1. Accordingly, the switchable charging path 158P allows for the charge current 162P to flow towards the reservoir capacitor CRES1 but not from the reservoir capacitor CRES1 to the bus line 12. Instead, the diode 160P blocks charge and thus prevents the charge current 162P from flowing to the node BSP to the bus line 12. As such, regardless of whether the switchable charging path 158P is closed or open, the switchable charging path 158P blocks discharge from the reservoir capacitor CRES1 to the bus line 12. In this manner, the power converter 106A cannot be discharged by the bus line 12 through the switchable charging path 158P once the input data signal SDATA goes low and is in the discharging state.

As such, the switchable charging path 158P is operable to be opened and closed. As shown in FIG. 7, the switch PWP is connected in series within the switchable charging path 158P between the node NWP and the node SSP. As such, the switch PWP is connected in series within the switchable charging path 158P between the cathode of the diode 160P and the reservoir capacitor CRES1. The switch PWP is operable to be opened and closed. Since the switch PWP is in series within the switchable charging path 158P, the switchable charging path 158P is configured to be opened and closed. In this example, the switch PWP is a PFET. Thus, the switch PWP has a source SWP that is connect to the node NWP within the switchable charging path 158P, a drain connected to the node SSP within the switchable charging path 158P, and a gate GWP coupled to receive a gate voltage GVP. Thus, the switch PWP is opened when the gate voltage GVP is high. In contrast, the switch PWP is closed when the gate voltage GVP is low.

The switch regulated capacitive flyback converter 108A includes a flyback capacitor CFLYP that is coupled to the switchable charging path 158P so that charge from the input data signal SDATA is stored by the flyback capacitor CFLYP when the switchable charging path 158P is open and is released by the flyback capacitor CFLYP when the switchable charging path 158P is closed. In this example, the flyback capacitor CFLYP is connected in shunt to the switchable charging path 158P between the cathode of the diode 160P and the source SWP of the switch PWP. As such, when the input data signal SDATA is in the charging state, charge from the input data signal SDATA flows through the diode 160P as the charge current 162P. However, when the switchable charging path 158P is open, the switch PWP is open and thus the switch PWP blocks the charge from flowing to the node SSP and thus to the reservoir capacitor CRES1. Instead, charge from the input data signal SDATA provides the charge current 162P and the charge current 162P charges the flyback capacitor CFLYP until the flyback capacitor CFLYP reaches approximately the voltage of the input data signal SDATA in the charging state less the turn on voltage of the diode 160P (e.g., in FIG. 7), until the voltage at node NWP is equal to the voltage on the bus line 12 when the input data signal SDATA is high minus a turn on voltage of the diode 160P. However, when the input data signal SDATA is in the charging state and the switchable charging path 158P is closed, the PWP is closed and thus charge can flow to the node SSB and the reservoir capacitor CRES1. The flyback capacitor CFLYP has a flyback capacitance that is substantially less than the reservoir capacitance of the reservoir capacitor CRES1. Accordingly, charge stored by the flyback capacitor CFLYP is released from the flyback capacitor CFLYP to the reservoir capacitor CRES1. Accordingly, the switch regulated capacitive flyback converter 108A is switchable to generate the charge current IS as a pulsed charge current.

To regulate the supply voltage, the switch regulated capacitive flyback converter 108A includes a switch control regulation circuit 164A. The switch control regulation circuit 164A is configured to switch the switchable charging path PWP so that the charge current IS is generated as a pulsed charge current. In this embodiment, the switch control regulation circuit 164A includes anding logic ANDP and a voltage comparator 166. In this embodiment, the voltage comparator 166 is formed as an op amp configured to provide hysteresis. The voltage comparator 166 thus includes an inverting terminal 168, non-inverting terminal 170, a positive supply terminal 172, and an output terminal 176. The inverting terminal 168 is connected to the node SSP, which is at the output of the switchable charging path 158P. The inverting terminal 168 is thus coupled to the reservoir capacitor CRES1 so that the inverting terminal 168 is driven by the supply voltage VS of the reservoir capacitor CRES1. The non-inverting terminal 170 is connected to the node BSP, which is at the input of the switchable charging path 158P. As such, the non-inverting terminal 170 is coupled to be driven by the bus line 12 and thus by the input data signal SDATA. The positive supply terminal 172 is connected to the bus line 12 so that the input data signal SDATA powers the voltage comparator 166. Thus, the voltage comparator 166 is powered by the bus line 12.

The voltage comparator 166 is configured to generate an enabling signal 178 from the output terminal 176. Accordingly, the voltage comparator 166 is configured to generate the enabling signal 178 in an enabling state so long as the voltage level of the input data signal SDATA is greater than the supply voltage level of supply voltage VS. However, the voltage comparator 166 is configured to generate the input data signal in a disabling state in response to the supply voltage level of the supply voltage exceeding the input data signal SDATA. In this embodiment, the enabling state is a high voltage state and the disabling state is a low voltage state. More specifically, the voltage comparator 166 operates in hysteresis. Thus, the voltage comparator 166 is configured to drive the enabling signal 178 at the output terminal 176 to the voltage level of the input data signal SDATA so long as there is a positive voltage differential from the non-inverting terminal 170 to the inverting terminal 168. Thus, when the input data signal SDATA is in the charging state and the voltage level of the input data signal SDATA exceeds the supply voltage level of the supply voltage, the voltage comparator 166 drives the enabling signal 178 high. However, when the input data signal SDATA is in the charging state and the supply voltage level of the supply voltage VS exceeds the voltage level of the input data signal, the voltage comparator 166 is configured to generate the enabling signal 178 in the disabling state. In this specific embodiment, the voltage comparator 166 is configured to drive the enabling signal 178 at the output terminal 176 to the negative supply terminal 174, which is low and approximately at ground. The voltage comparator 166 maintains the enabling signal 178 at the output terminal 176 low in the disabling state until the voltage level of the input data signal SDATA again exceeds the supply voltage level of the supply voltage VS. Furthermore, the voltage comparator 166 is configured to generate the enabling signal 178 low and in the disabling state while the input data signal SDATA is in the discharge state. This is because the positive supply terminal 172 is at ground. Thus, when the input data signal SDATA is in the discharging state (and thus the voltage level of the input data signal SDATA is low), the voltage comparator 166 cannot drive the enabling signal 178 above the discharging state and thus the enabling signal 178 must be maintained low until the voltage level of the input data signal SDATA again exceeds the supply voltage level of the supply voltage VS. As shown in FIG. 2, this won't occur until the next activation edge of the input data signal SDATA when the input data signal SDATA is again provided in the charging state.

The anding logic ANDP is configured to perform a 3 variable anding operation. As such, the anding logic ANDP includes an input terminal CCP, an input terminal BUSP, an input terminal SYP, a positive supply terminal SANP, a negative supply terminal GANP, and an output terminal OAP. In this embodiment, the positive supply terminal SANP is coupled to the bus line 12 so that the anding logic is powered by input data signal SDATA. The negative supply terminal GANP is connected to ground. The input terminal CCP is coupled to the output terminal 176 so as to receive the enabling signal 178. The input terminal BUSP is coupled to the bus line 12 so as to receive the input data signal SDATA. The input terminal SYP receives the oscillation signal OVR_CLK from the oscillator 14 in the decoder 10 shown in FIG. 7. As discussed with respect to FIG. 2, the oscillator signal OVR_CLK is generated by the oscillator 14 when the input data signal SDATA is high during a data frame. Also, as discussed above, the oscillator 14 is configured to generate the oscillator signal OVR_CLK such that the pulse frequency of the oscillator signal OVR_CLK is substantially greater than the pulse frequency of SDATA. This is because the decoder 10 uses the oscillator signal OVR_CLK to measure the pulse duration of the data pulses DP to decode the input data signal SDATA, as discussed above.

Referring again to FIG. 8, the anding logic ANDP is configured to generate the switch control signal WSP by performing a 3 variable anding operation on the enabling signal 178 at the input terminal CCP, the input data signal SDATA at the input terminal BUSP, and the oscillation signal OVR_CLK at the input terminal SYP. Thus, the anding logic AND generates the switch control signal WSP in a high voltage state (as provided at the positive supply terminal SANPP) when the enabling signal is high in the enabling state, the input data signal SDATA is high in the charging state, and the oscillation signal OVR_CLK is high during one of the pulses OP (shown in FIG. 2). Otherwise, the anding logic OAP generates the switch control signal WSP is low.

In this embodiment, the output terminal OAP of the anding logic ANDP is connected to a node WNP and the anding logic ANDP is configured to drive the node WNP with the switch control signal WSP from the output terminal OAP. Furthermore, the flyback capacitor CFLYP is connected in series between the node NWP and the node WNP so that the charge current 162P from the diode 160P in the switchable charging device and the switch control signal WSP drive opposite sides of the flyback capacitor CFLYP. In response to at least one of the input terminals CCP, BUSP, SYP being in a low voltage state, the anding logic ANDP drives the node WNP to the negative supply terminal GANP, which is grounded. Thus, the switch control signal WSP is in the low voltage state (in this case, at ground). In response, the inverter IVP drives the gate voltage GVP to the high voltage state.

Accordingly, the switch control regulation circuit 164A is configured to open the switchable charging path 158P when the input data signal SDATA is low and in the discharge state. Thus, the reservoir capacitor CRES cannot discharge through the switchable charging path 158P and charge stored by the flyback capacitor CFLYP cannot propagate to the reservoir capacitor CRES1 through the switchable charging path 158P. Thus, the switch PWP is switched open and the switchable charging path 158P blocks the charge current 162P so that the charge current 162P does not propagate to the reservoir capacitor CRES1. Instead, the node WNP is driven almost to ground.

Once the input data signal SDATA is in the charging state, charge from the input data signal SDATA generates the charge current 162P through the diode 160P. Thus, when the input data signal SDATA is in the charging state and the enabling signal is high in the enabling state, the switch control signal WSP oscillates between being high and being low in accordance with the oscillation signal OVR_CLK. In this case, the oscillation signal OVR_CLK is provided high during the oscillation pulses OP and are provided low between the oscillation pulses OP. As such, the switchable charging path 158P is switched open and closed in accordance with the oscillation signal OVR_CLK. In this example, the switch control signal WNP is generated in the high voltage state during the oscillation pulses OP and is driven to the low voltage state between the oscillation pulses OP. An inverter IVP is connected in series between the node WNP and the gate GWP so that the input terminal of the inverter INP is connected to the node WNP and the gate is connected to an output terminal of the inverter IVP. As such, the switchable charging path 158P is switched so that the charge current IS is generated as a pulsed charge current that is synchronized in accordance with the oscillation signal OVR_CLK.

Thus, so long as the input data signal SDATA is in the charging state and the enabling signal 178 is high in the enabling state, the charge current is generated as a pulsed charge current to charge the reservoir capacitor CRES1. More specifically, when the oscillation signal OVR_CLK is low, charge from the input data signal SDATA is driven through the diode 160P and the charge current 162P charges the flyback capacitor CFLYP since the switch control signal WSP is driven to the low voltage state and thus the node WNP is approximately at ground. Furthermore, the switch PWP is open when the switch control signal WSP is in the low voltage state and thus the switch PWP blocks charge from the bus line 12 to the reservoir capacitor CRES1. Since the diode 160P prevents the flyback capacitor CFLYP from being discharge by the bus line 12, the flyback capacitor CFLYP is charged until the flyback voltage across the flyback capacitor CFLYP is equal to approximately the voltage level of the input data signal SDATA at the bus line 12 minus the voltage drop across the diode 160P. Accordingly, the flyback capacitor CFLYP stores the charge from the input data signal SDATA.

However, when the oscillation signal OVR_CLK is driven high during one of the oscillation pulses OP, the anding logic ANDP drives the switchable driving signal WSP to the high voltage state. As such, the node WNP is powered by the positive supply terminal SANP to approximately the voltage level of the input data signal SDATA in the charging state. The switch PWP is closed when the switch control signal WSP is in the high voltage state. Thus charge is released from the flyback capacitor CFLYP to the node SSP and thus to the reservoir capacitor. In this manner, a charge pulse is generated in the charge current IS.

The switchable charging path 158P is switched to generate the charge current IS as a pulsed charge current that is synchronized in accordance with the oscillation signal OVR_ CLK so long as the enabling signal 178 remains high in the enabling state and the input data signal SDATA is high in the charging state. When the input data signal SDATA is in the charging state, the charge current IS charges the reservoir capacitor CRES in response to the voltage level of the supply voltage VS drooping below a target voltage level. In this case, the target voltage level is the voltage level of the input data signal SDATA. This is because, as explained above, the voltage comparator 166 generates the enabling signal 178 in the enabling state so long as the input data signal SDATA is in the charging state and the supply voltage VS is less than the voltage level of the input data signal SDATA. Furthermore, since the flyback capacitance of the flyback capacitor CFLYP is substantially less than the reservoir capacitance of the reservoir capacitor CRES1, the reservoir capacitor CRES1 will absorb the charge pulses as long as the supply voltage level of the supply voltage VS is less than the voltage level of the input data signal SDATA.

However, the voltage comparator 166 generates the enabling signal 178 low and in the disabling state in response to the supply voltage level of the supply voltage VS exceeding the first input data signal SDATA in the charging state. In response, the anding logic ANDP drives the switch control signal WSP to the low voltage state. Accordingly, the oscillation signal OVR_CLK can no longer control the switch PWP because the switch control signal WSP is low and the node WNP is driven to ground. As such, the charge current IS is disabled in response to the supply voltage VS exceeding the input data signal SDATA when the input data signal SDATA is in the charging state.

Referring again to FIG. 2 and FIG. 7, the master bus controller 96 is configured to initiate communication of a data frame along the bus line 12 with the input data signal SDATA during the time slot TS[IN]. During the initial time slot TS[IN], in FIG. 2, the master bus controller 96 is configured to initiate communication of the next data frame along the bus line 12 by providing the input data signal SDATA in a discharging state (i.e., the low voltage state). Thus prior to the activation edge AE[0] of the next data frame, the master bus controller 96 is configured to initiate communication of the data frame by providing the input data signal SDATA in the discharging state (e.g., the low voltage state). This indicates to the slave bus controller 94 and in particular to the power conversion circuitry 104A that the master bus controller 96 is or will begin transmitting data pulses for the next data frame to the slave bus controller 94. Alternatively or additionally, the master bus controller 96 may initiate communication of the data frame simply by providing the activation edge AE[0], thereby indicating to the slave bus controller 94 and the power conversion circuitry 104A that the next data frame is being provided. It should be noted that the data modulator 98, the decoder 10, and the slave bus controller 94 may be configured to initiate data frames with a sequence of data pulses provided in accordance with a start of sequence (SOS) pulse pattern. Thus, the input data signal SDATA may be provided in a discharging state (i.e., the low voltage state) either before or at a beginning of the sequence of data pulses.

The control circuitry 146 of the power conversion circuitry 104A in the slave bus controller 94 is configured to open the second switchable bypass path 140 in the power conversion circuitry 104A in response to the input data signal SDATA indicating that the master bus controller 96 has initiated communication of the data frame along the bus line 12. Thus, in this embodiment, the slave bus controller 94 is configured to open the second switchable bypass path 140 in response to the master bus controller 96 dropping the input data signal SDATA to the communication state during the initial time slot TS[IN]. The slave bus controller 94 is configured to maintain the first switchable bypass path 138 as open.

Accordingly, during a communication session where data pulses DP[0]-DP[6] are being provided during timeslots TS[0]-TS[6] of the data frame, the power management system 100A operates in a communication session state. During the communication session of the power management system 100A, the first switchable bypass path 138 is open, and the second switchable bypass path 140 is also open. The power management system 100A is provided in the communication session state when the input data signal SDATA is dropped to the discharging state and throughout the timeslots TS[IN], TS[0]-TS[6]. Since the first switchable bypass path 138 and the second switchable bypass path 140 are open during the communication session state, the rectifier D1 is not bypassed but rather, a rectified charging current can be produced from the input data signal SDATA that propagates through the charging path 142A to charge the reservoir capacitor CRES1. At start up, the rectified charging current does pass through the rectifier D1 to charge the reservoir capacitor CRES1. However, during normal operation the supply voltage VS should not drop sufficiently to turn on the rectifier D1 during the communication interval to generate the rectified charging current. Instead switching regulator 108A will maintain the supply voltage VS during a communication session.

After the timeslot TS[6] is over, the master bus controller 96 is again configured to hold the input data signal SDATA in the charging state during the communication interlude between the master bus controller 96 and the slave bus controller 94. The beginning of the communication interlude is thus synchronized with the activation edge AE[7] at the end of the data frame. The power management system 100A is optionally operable in a fast charging switch state for a charging time interval after the beginning of the communication interlude between the master bus controller 96 and the slave bus controller 94. The control circuitry 146 is configured to close the first switchable bypass path 138 and to close the second switchable bypass path 140 in response to the communication interlude to place the power management system 100A in the fast charging switch state. Normally the fast charging switch state will only be used after a communication session used to read data from the slave bus controller 94. In such a session the slave bus controller 94 is used to send data to the master bus controller 96. As such there is no valid input for the switching regulator 108A to use to create the current IS because in this case SDATA is driven from VS.

In this embodiment, the control circuitry 146 is configured to close the first switchable bypass path 138 in the power conversion circuitry 104A in response to the activation edge AE[7] that ends the data frame. Additionally, the control circuitry 146 is configured to close the second switchable bypass path 140 in the power conversion circuitry 104A in response to the activation edge AE[7]. While the power management system 100A is operating in the fast charging switch state, a charging current bypasses both the rectifier D1 and the resistor 144, since the first switchable bypass path 138 and the second switchable bypass path 140 are both closed. The power management system 100A is maintained in the fast charging switch state for a charging time interval. In this manner, the reservoir capacitor CRES1 is quickly recharged to a maximum voltage level after the communication interlude has begun.

Once the charging time interval has passed after closing the first switchable bypass path 138 and the second switchable bypass path 140 in response to the communication interlude, the control circuitry is configured to open the first switchable bypass path 138. In this embodiment, after the charging time interval has passed since the activation edge AE[7] was provided in the input data signal SDATA, the control circuitry 146 is configured to open the first switchable bypass path 138. In this case, the power management system 100A is back in the idling switch state. The cycle of the idling switch state, the communication session state, and the fast charging switch state can be repeated during the communication interlude and the communication session for the next data frame in which data is read from the slave bus controller 94. In one embodiment, the charging time interval is eight times greater than one of the time slots TS[0]-TS[6]. For example, in one embodiment, the charging time interval is approximately 2-3 µs.

The power conversion circuitry 104A further includes a Power-on-Reset (POR) circuit 180, and a watchdog circuit (WDC) 182. The POR circuit 180 in the power conversion circuitry 104A of the slave bus controller 94 is provided to monitor the supply voltage VSD. If the supply voltage VSD is provided below a threshold voltage, this indicates that the supply voltage VS and the supply voltage VSD are insufficient to provide sufficient power so as to operate the switches S1, S2 of the power conversion circuitry 104A. This may occur during dead battery conditions or at startup before the slave bus controller 94 has had sufficient time to be charged. The POR circuit 180 is configured to detect when the supply voltage VSD has been provided above the threshold voltage level. The POR circuit 180 generates a POR signal 184. The POR circuit 180 generates the POR signal 184 such that the POR signal 184 indicates that the supply voltage VSD is above the threshold voltage once the POR circuit 180 has detected that the supply voltage VSD is above the threshold voltage. The control circuitry 146 receives the POR signal 184. Once the POR signal 184 indicates that the supply voltage VSD is above the threshold voltage, the control circuitry 146 is configured to operate the switches S1, S2 as described above. In particular, the control circuitry 146 may initially provide the switches S1, S2 in the manner described above with respect to the idling switch state for the power management system 100A.

The WDC 182 in the power conversion circuitry 104A of the slave bus controller 94 is configured to monitor the input data signal SDATA. In this example, the input data signal SDATA is an input data voltage. If the input data signal SDATA drops below a threshold voltage level for a temporal period, the WDC 182 detects a reset condition. In this case, the WDC 182 is configured to generate a watchdog signal 186 that indicates when the WDC 182 has detected the reset condition (i.e., the input data signal SDATA has been provided below the threshold voltage level for the time interval). The control circuitry 146 receives the watchdog signal 186 and responds by requesting a reset for the slave bus controller 94.

FIG. 8 illustrates one exemplary embodiment of a power management system 100B, along with ancillary circuitry. The power management system 100B is an example of the power management system 100 described above with respect to FIGS. 5 and 6. Accordingly, the power management system 100B that may be provided in the bus interface system 92 shown in FIG. 5 and FIG. 6.

The power management system 100B is provided in the bus interface system 92 to distribute power from the master bus controller 96 to the slave bus controller 94. Thus, the bus line 12 is provided in the bus interface system 92 to connect the master bus controller 96 to the slave bus controller 94. In accordance with the PWM bus protocol (such as the PWM bus protocols described above), the master bus controller 96 is configured to generate the input data signal SDATA and to transmit the input data signal SDATA along the bus line 12 to the slave bus controller 94. No other bus line is provided to couple the master bus controller 96 to the slave bus controller 94.

Again, as described above, the slave bus controller 94 is coupled to the bus line 12 so as to receive the input data signal SDATA from the master bus controller 96. The slave bus controller 94 includes an embodiment of the power conversion circuitry 104B. The power conversion circuitry 104B is configured to convert the input data signal SDATA into a supply voltage VS. The power conversion circuitry 104B shown in FIG. 8 is part of the power management system 100B that is provided in the slave bus controller 94. The supply voltage VS may be utilized to power the decoder 10 (shown in FIGS. 5 and 6) along with other circuitry in the slave bus controller 94.

In FIG. 8, the master bus controller 96 includes the same voltage regulation circuit 102, the same data modulator 98, the same master switchable bypass path CSM, the same capacitor CBPA and the same control circuitry 152. The voltage regulation circuit 102, the data modulator 98, the master switchable bypass path CSM, the capacitor CBPA and the control circuitry 152 are all part of the power management system 100B and operate in the same manner as described above with respect to FIG. 7. More specifically, the slave bus controller 94 shown in FIG. 8 includes power conversion circuitry 104B, which is an embodiment of the power conversion circuitry 104 shown in FIG. 5 and FIG. 6. The power conversion circuitry 104B is a part of the power management system 100B. In this embodiment, the power conversion circuitry 104B includes the same power converter 106A described above with respect to FIG. 7. Accordingly, the power converter 106A is operated in the same manner to convert the input data signal SDATA to the supply voltage VS with the reservoir capacitor CRES1.

As shown in FIG. 8, the power conversion circuitry 104B includes a switching regulator 108B. This switching regulator 108B is an embodiment of the switching regulator 108 shown in FIG. 5. The switching regulator 108B is thus configured to generate the charge current IS from the input data signal SDATA transmitted along the bus line 12 by the data modulator 98 of the master bus controller 96 in accordance with the PWM bus protocol. The switching regulator 108B is coupled to charge the reservoir capacitor CRES1 with the charge current IS. The switching regulator 108B is configured to generate the charge current IS such that the charge current IS regulates the supply voltage VS by charging the reservoir capacitor CRES1.

In this embodiment, the switching regulator 108B is a switch regulated capacitive flyback converter 108B. Thus, the switch regulated capacitive flyback converter 108B is switchable to generate the charge current IS by storing and releasing charge from the input data signal SDATA while the data signal SDATA is in the charging state (i.e., while bus line 12 is high). Accordingly, the switch regulated capacitive flyback converter 108B is configured to generate the charge current IS as a pulsed charge current.

As shown in FIG. 8, the power conversion circuitry 104B includes a switching regulator 108B. This switching regulator 108B is an embodiment of the switching regulator 108 shown in FIG. 5. The switching regulator 108B is thus configured to generate the charge current IS from the input data signal SDATA transmitted along the bus line 12 by the data modulator 98 of the master bus controller 96 in accordance with the PWM bus protocol. The switching regulator 108B is coupled to charge the reservoir capacitor CRES1 with the charge current IS. The switching regulator 108B is configured to generate the charge current IS such that the charge current IS regulates the supply voltage VS by charging the reservoir capacitor CRES1.

In this embodiment, the switch regulated capacitive flyback converter 108B includes the same switchable charging path 158P with the same diode 160P and the same switch PWP described above in FIG. 7. In addition, the switch regulated capacitive flyback converter 108B includes the same flyback capacitor CFLYP as described above in FIG. 7.

As shown in FIG. 8, the switch regulated capacitive flyback converter 108B also includes a switchable charging path 158N connected between the bus line 12 in the reservoir capacitor CRES1. In this embodiment, the switchable charging path 158N is connected between the node BSN and the node SSN. The node BSN is connected to the input terminal PCI and the input terminal PCI is connected to the bus line 12. The node SSN is connected to the reservoir capacitor CRES. The switchable charging path 158N includes a diode 160N and a switch PWN, which in this example is PFET.

The diode 160N is connected in series within the switchable charging path 158N between the node BSN and a node NWN, which is coupled through the switch PWN to the reservoir capacitor. As such, an anode of the diode 160N is connected to receive charge from the bus line 12 while the cathode of the diode 160N is connected to the node NWN and thus is coupled to transmit that charge toward the reservoir capacitor CRES1. As shown in FIG. 8, the diode 160N is connected so that the forward current direction of the diode 160N is from the bus line 12 toward the reservoir capacitor CRES1. Accordingly, the diode 160N transmits charge from the bus line 12 to the reservoir capacitor CRES1 but blocks charge from being transmitted through the switchable charging path 158N towards the bus line 12. Accordingly, the diode 160N is configured to transmit a charge current 162N generated from the input data signal SDATA while the input data signal SDATA is high and in the charging state.

In this manner, as a result of the diode 160N, the switchable charging path 158N is configured to unilaterally conduct charge toward the reservoir capacitor CRES1. Accordingly, the switchable charging path 158N allows for the charge current 162N to flow towards the reservoir capacitor CRES1 but not from the reservoir capacitor CRES1 to the bus line 12. Instead, the diode 160N blocks charge and thus prevents the charge current 162N from flowing to the node BSN to the bus line 12. As such, regardless of whether the switchable charging path 158N is closed or open, the switchable charging path 158N blocks discharge from the reservoir capacitor CRES1 to the bus line 12. In this manner, the power converter 106A cannot be discharged by the bus line 12 through the switchable charging path 158N once the input data signal SDATA goes low and is in the discharging state.

As such, the switchable charging path 158N is operable to be opened and closed. As shown in FIG. 8, the switch PWN is connected in series within the switchable charging path 158N between the node NWN and the node SSN. As such, the switch PWN is connected in series within the switchable charging path 158N between the cathode of the diode 160N and the reservoir capacitor CRES1. The switch PWN is operable to be opened and closed. Since the switch PWN is in series within the switchable charging path 158N, the switchable charging path 158N is configured to be opened and closed. In this example, the switch PWN is a PFET. Thus, the switch PWN has a source SWN that is connect to the node NWN within the switchable charging path 158N, a drain DWN connected to the node SSN within the switchable charging path 158N, and a gate GWN coupled to receive a gate voltage GVN. Thus, the switch PWN is opened when the gate voltage GVN is high. In contrast, the switch PWN is closed when the gate voltage GVN is low.

The switch regulated capacitive flyback converter 108B includes a flyback capacitor CFLYN that is coupled to the switchable charging path 158N so that charge from the input data signal SDATA is stored by the flyback capacitor CFLYN when the switchable charging path 158N is open and is released by the flyback capacitor CFLYN when the switchable charging path 158N is closed. In this example, the flyback capacitor CFLYN is connected in shunt to the switchable charging path 158N between the cathode of the diode 160N and the source SWN of the switch PWN. As such, when the input data signal SDATA is in the charging state, charge from the first input data signal SDATA flows through the diode 160N as the charge current 162N. However, when the switchable charging path 158N is open, the switch PWN is open and thus the switch PWN blocks the charge from flowing to the node SSN and thus to the reservoir capacitor CRES1. Instead, charge from the input data signal SDATA provides the charge current 162N and the charge current 162N charges the flyback capacitor CFLYN until the flyback capacitor CFLYN reaches approximately the voltage of the input data signal SDATA in the charging state minus the turn on voltage of diode 160N (e.g., in FIG. 8, until the voltage at node NWN is equal to the voltage on the bus line 12 when the input data signal SDATA is high minus a turn on voltage of the diode 160N.) However, when the input data signal SDATA is in the charging state and the switchable charging path 158N is closed, the PWN is closed and thus charge can flow to the node SSB and the reservoir capacitor CRES1. The flyback capacitor CFLYN has a flyback capacitance that is substantially less than the reservoir capacitance of the reservoir capacitor CRES1. Accordingly, charge stored by the flyback capacitor CFLYN is released from the flyback capacitor CFLYN to the reservoir capacitor CRES1.

To regulate the supply voltage, the switch regulated capacitive flyback converter 108B includes a switch control regulation circuit 164B. The switch control regulation circuit 164B includes the same voltage comparator 166 and the same anding logic ANDP described above with respect to FIG. 7. The voltage comparator 166 and the anding logic ANDP operate in the same manner with respect to the flyback capacitor CFLYP and the switchable charging path 158P as described above in FIG. 7, except that in FIG. 8, the flyback capacitor CFLYP and the flyback capacitor CFLYN are connected in parallel with respect to bus line 12. Furthermore, in this embodiment, the flyback capacitor CFLYN has a flyback capacitance that is approximately equal to the flyback capacitance of the flyback capacitor CFLYP. Thus, the flyback capacitor CFLYP and the flyback capacitor CFLYN split the charge from the bus line 12 approximately evenly. As a result, in FIG. 8, the flyback capacitor CFLYP receives half of the charge that it received with respect to the embodiment shown in FIG. 7. Otherwise, the switch control regulation circuit 164B operates the switchable charging path 158P and the flyback capacitor CFLYP in the same manner described above with respect to FIG. 7.

However, the switch control regulation circuit 164B also includes an inverter ICLK having an input terminal connected to receive the oscillation signal IVR_CLK from the oscillator 14 and anding logic ANDP. The inverter ICLK is configured to generate an oscillation signal IVR_CLK that is inverted with respect to the oscillation signal IVR_CLK. Thus, when the oscillation signal OVR_CLK is driven from the low voltage state to the high voltage state, the inverter IVR_CLK is configured to drive the inverter oscillation signal from the high voltage state to the low voltage state. Additionally, when the oscillation signal OVR_CLK is driven from the high voltage state to the low voltage state, the inverter is configured to drive the inverter oscillation signal IVR_CLK from the low voltage state to the high voltage state.

Accordingly, the switch regulated capacitive flyback converter 108B is switchable to store and release charge from the bus line 12 to the flyback capacitor CFLYP and the flyback capacitor CFLYN so that the charge current IS is a pulse charge current synchronized in accordance with the oscillation signal IVR_CLK. However, the oscillation signal OVR_CLK and the inverted oscillation signal IVR_CLK provide antipodal synchronization. Thus, when the oscillation signal OVR_CLK is driven into the high voltage state during each of the oscillation pulses OP shown in FIGS. 2 and 4, the inverted oscillation signal IVR_CLK is a low voltage state and between oscillation pulses. In contrast, when the oscillation signal OVR_CLK is driven into the low voltage state after one of the oscillation pulses OP but before the next one of the oscillation pulses OP (see FIGS. 2 and 4), the inverted oscillation signal IVR_CLK is in the high voltage state during an oscillation pulse.

Thus, the switch control regulation circuit 168B closes the switchable charging path 158P and the flyback capacitor CFLYP releases charge to the reservoir capacitor CRES1 while the switchable charging path 158N is open. However, while the flyback capacitor CFLYP releases charge to the reservoir capacitor CRES1, the flyback capacitor CFLYN is being charged by the charge current 162N. Accordingly, the flyback capacitor CFLYN is being charged by the charge current 162N while the flyback capacitor CFLYP releases charge to the reservoir capacitor CRES1 and generates a current pulse in the charge current IS.

However, the switch control regulation circuit 164B closes the switchable charging path 158N and the flyback capacitor CFLYN releases charge to the reservoir capacitor CRES1 while the switchable charging path 158P is open. However, while the flyback capacitor CFLYN releases charge to the reservoir capacitor CRES1, the flyback capacitor CFLYP is being charged by the charge current 162P. Accordingly, the flyback capacitor CFLYP is being charged by the charge current 162P while the flyback capacitor CFLYN releases charge to the reservoir capacitor CRES1 and generates a current pulse in the charge current IS.

As mentioned above, the switch regulated capacitive flyback converter 108B shown in FIG. 8 includes a switch control regulation circuit 164B. The switch control regulation circuit 164B includes the same voltage comparator 166 and the same anding logic ANDP described above with respect to FIG. 7. Thus, the voltage comparator 166 and the anding logic ANDP operate in the same manner with respect to the flyback capacitor CFLYP. Furthermore, the switch control regulation circuit 164B also includes the anding logic ANDN and the inverter ICLK that generates the inverted clock signal IVR_CLK. The anding logic ANDN operates with respect to the voltage comparator 166 and the bus line 12 in the same manner as the anding logic ANDP.

More specifically, the anding logic ANDN is configured to perform the same 3 variable anding operation as the anding logic ANDP. As such, the anding logic ANDN includes an input terminal CCN, an input terminal BUSN, an input terminal SYNN, a positive supply terminal SANN, a negative supply terminal GANN, and an output terminal OAN. In this embodiment, the positive supply terminal SANN is coupled to the bus line 12 so that the anding logic ANDN is powered by input data signal SDATA. The negative supply terminal GANN is connected to ground. The input terminal CCN is coupled to the output terminal 176 so as to receive the enabling signal 178. The input terminal BUSN is coupled to the bus line 12 so as to receive the input data signal SDATA.

However, the input terminal SYN is connected to the output terminal of the inverter ICLK to receive the oscillation signal IVR_CLK. As discussed with respect to above, the oscillator signal OVR_CLK is generated by the oscillator 14 when the input data signal SDATA is high during a data frame. Accordingly, the inverter ICLK also generates the oscillator signal IVR_CLK when the input data signal SDATA is high during a data frame. Thus, the oscillator signal IVR_CLK has a pulse frequency substantially greater than the pulse frequency of the SDATA but equal to the pulse frequency of the oscillator signal OVR_CLK. However, as discussed above, a phase difference between the oscillator signal OVR_CLK and the oscillator signal IVR_CLK is approximately 180 degrees.

Referring again to FIG. 8, the anding logic ANDN is configured to generate the switch control signal WSN by performing a 3 variable anding operation on the enabling signal 178 at the input terminal CCN, the input data signal SDATA at the input terminal BUSN, and the oscillation signal IVR_CLK. Thus, the anding logic ANDN generates the switch control signal WSN in a high voltage state (as provided at the positive supply terminal SANN) when the enabling signal is high in the enabling state, the input data signal SDATA is high in the charging state, and the oscillation signal IVR_CLK is high during one of the pulses OP (shown in FIG. 2). Otherwise, the anding logic ANDN generates the switch control signal WSN is low.

In this embodiment, the output terminal OAN of the anding logic ANDN is connected to a node WNN and the anding logic ANDN is configured to drive the node WNN with the switch control signal WSN from the output terminal OAN. Furthermore, the flyback capacitor CFLYN is connected in series between the node NWN and the node WNN so that the charge current 162N from the diode 160N in the switchable charging device and the switch control signal WSN drive opposite sides of the flyback capacitor CFLYN. In response to at least one of the input terminals CCN, BUSN, SYN being the low voltage state, the anding logic ANDN drives the node WNN to the negative supply terminal GANN, which is grounded. Thus, the switch control signal WSN is in the low voltage state (in this case, at ground). In response, the inverter IVN drives the gate voltage GVN to the high voltage state.

Accordingly, the switch control regulation circuit 164B is configured to open the switchable charging path 158N when the input data signal SDATA is low and in the discharge state. Thus, the reservoir capacitor CRES cannot discharge through the switchable charging path 158N and charge stored by the flyback capacitor CFLYN cannot propagate to the reservoir capacitor CRES1 through the switchable charging path 158N. Thus, the switch PWN is switched open and the switchable charging path 158N blocks the charge current 162N so that the charge current 162N does not propagate to the reservoir capacitor CRES1. Instead, the node WNN is driven almost to ground.

Once the input data signal SDATA is in the charging state, charge from the input data signal SDATA generates the charge current 162N through the diode 160N. Thus, when the input data signal SDATA is in the charging state and the enabling signal is high in the enabling state, the switch control signal WSN oscillates between being high and being low in accordance with the oscillation signal IVR_CLK. In this case, the oscillation signal IVR_CLK is provided between the oscillation pulses OP and is provided low during one of the oscillation pulses OP. As such, the switchable charging path 158N is switched open and closed in accordance with the oscillation signal IVR_CLK. In this example, the switch control signal WSN is generated in the high voltage state between the oscillation pulses OP and is driven to the low voltage state during one of the oscillation pulses OP. An inverter IVN is connected in series between the node WNN and the gate GWN so that the input terminal of the inverter INN is to the node WNN and the gate is connected to an output terminal of the inverter IVN. As such, the switchable charging path 158N is switched so that the charge current IS is generated as a pulsed charge current that is synchronized in accordance with the oscillation signal IVR_CLK.

Thus, so long as the input data signal SDATA is in the charging state and the enabling signal 178 is high in the enabling state, the charge current is generated as a pulsed charge current to charge the reservoir capacitor CRES1. More specifically, when the oscillation signal IVR_CLK is low, charge from the input data signal SDATA is driven through the diode 160N and the charge current 162N charges the flyback capacitor CFLYN since the switch control signal WSN is driven to the low voltage state and thus the node WNN is approximately at ground. Furthermore, the switch PWN is open when the switch control signal WSN is in the low voltage state and thus the PFET PWN blocks charge from the bus line 12 to the reservoir capacitor CRES1. Since the diode 160N prevents the flyback capacitor CFLYN from being discharged by the bus line 12, the flyback capacitor CFLYN is charged until the flyback voltage across the flyback capacitor CFLYN is equal to approximately the voltage level of the input data signal SDATA at the bus line 12 minus the voltage drop across the diode 160N. Accordingly, the flyback capacitor CFLYN stores the charge from the input data signal SDATA.

However, when the oscillation signal IVR_CLK is driven high during one of the oscillation pulses OP, the anding logic ANDN drives the switchable driving signal WSN to the high voltage state. As such, the node WNN is powered by the positive supply terminal SANN to approximately the voltage level of the input data signal SDATA in the charging state. The switch PWN is closed when the switch control signal WSN is in the high voltage state. Thus charge is released from the flyback capacitor CFLYN to the node SSN and thus to the reservoir capacitor. In this manner, a charge pulse is generated in the charge current IS.

The switchable charging path 158N is switched to generate the charge current IS as a pulsed charge current that is synchronized in accordance with the oscillation signal IVR_CLK so long as the enabling signal 178 remains high in the enabling state and the input data signal SDATA is high in the charging state. When the input data signal SDATA is in the charging state, the charge current IS charges the reservoir capacitor CRES in response to the voltage level of the supply voltage VS drooping below a target voltage level.

In this case, the target voltage level is approximately the voltage level of the input data signal SDATA. This is because, as explained above, the voltage comparator 166 generates the enabling signal 178 in the enabling state so long as the input data signal SDATA is in the charging state. Furthermore, since the flyback capacitance of the flyback capacitor CFLYN is substantially less than the reservoir capacitance of the reservoir capacitor CRES1, the reservoir capacitor CRES1 will absorb the charge pulses as long as the supply voltage level of the supply voltage VS is less than the voltage level of the input data signal SDATA.

However, the voltage comparator 166 generates the enabling signal 178 low and in the disabling state in response to the supply voltage level of the supply voltage VS exceeding the input data signal SDATA in the charging state. In response, the anding logic ANDN drives the switch control signal WSN to the low voltage state. Accordingly, the oscillation signal IVR_CLK can no longer control the switch PWN because the switch control signal WSN is low and the node WNN is driven to ground. As such, the charge current IS is disabled in response to the supply voltage VS exceeding the input data signal SDATA when the input data signal SDATA is in the charging state.

FIG. 9 illustrates one exemplary embodiment of a power management system 100C, along with ancillary circuitry. The power management system 100C is an example of the power management system 100 described above with respect to FIGS. 5 and 6. Accordingly, the power management system 100C that may be provided in the bus interface system 92 shown in FIG. 5 and FIG. 6.

The power management system 100C is provided in the bus interface system 92 to distribute power from the master bus controller 96 to the slave bus controller 94. Thus, the bus line 12 is provided in the bus interface system 92 to connect the master bus controller 96 to the bus line 12. In accordance with the PWM bus protocol (such as the PWM bus protocols described above), the master bus controller 96 is configured to generate the input data signal SDATA and to transmit the input data signal SDATA along the bus line 12 to the slave bus controller 94. No other bus line is provided to couple the master bus controller 96 to the slave bus controller 94.

In FIG. 9, the master bus controller 96 includes the same voltage regulation circuit 102, the same data modulator 98, the same master switchable bypass path 150 and the same control circuitry 152 as described above with respect to FIG. 7. The voltage regulation circuit 102, the data modulator 98, the master switchable bypass path 150, and the control circuitry 152 are all part of the power management system 100C and operate in the same manner as described above with respect to FIG. 7.

As shown in FIG. 9, the master bus controller 96 includes the voltage regulation circuit 102, the data modulator 98, and the control circuitry 152, which were described above with respect to FIG. 7 and are part of the power management system 100C. In addition, the master bus controller 96 includes a bypass capacitor CX and a capacitor CBX, which are also part of the power management system 100C. The bypass capacitor CX provides an RF bypass and is optional. The capacitor CX in the master bus controller 96 is coupled in shunt with respect to the bus line 12. Thus the capacitor CX provides high frequency filtering that removes voltage spikes from the input data signal SDATA due to the operation of the PFET FETM1. The capacitor CX is an optional RF bypass. In alternative embodiments, there may be a switchable bypass path (similar to the embodiment in FIG. 9) coupled to bypass the data modulator 98 at an output terminal of the voltage regulation circuit 102 and the bus line 12. The switchable bypass path may be coupled to the bus line 12 in the segment between the node PP and the capacitor CX.

The capacitor CBX is also coupled in shunt to decouple the voltage regulation circuit 102 from any input data signals transmitted along the bus line from the slave bus controller 94 to the master bus controller 96. The capacitor CBX thus helps reduce ripple variations.

The slave bus controller 94 is coupled to the bus line 12 so as to receive the input data signal SDATA from the master bus controller 96 along the bus line 12. The slave bus controller 94 includes an embodiment of the power conversion circuitry 104C. The power conversion circuitry 104C is configured to convert the input data signal SDATA into a supply voltage VS. The power conversion circuitry 104C shown in FIG. 9 is part of the power management system 100C that is provided in the slave bus controller 94. The supply voltage VS may be utilized to power the decoder 10 (shown in FIGS. 5 and 6) along with other circuitry in the slave bus controller 94.

Furthermore, the slave bus controller 94 shown in FIG. 9 includes power conversion circuitry 104C, which is an embodiment of the power conversion circuitry 104 shown in FIG. 5 and FIG. 6. The power conversion circuitry 104C is a part of the power management system 100C. In this embodiment, the power conversion circuitry 104C includes a power converter 106B, which is an embodiment of the power converter 106B shown in FIGS. 5 and 6. Thus, the power converter 106B shown in FIG. 9 is also configured to convert the input data signal SDATA to the supply voltage VS.

The power converter 106B shown in FIG. 9 includes a decoupling stage 200, a rectified switchable charging path 202, a first switchable bypass path 204, a second switchable bypass path 206, a third switchable bypass path 208, the reservoir capacitor CRES1, and the reservoir capacitor CRES2. As shown in FIG. 9, the decoupling stage 200 is coupled to the input terminal PCI from which the power converter 106B receives the input data signal SDATA from the bus line 12. The decoupling stage 200 includes a capacitor C1D and a capacitor C2D both coupled in shunt with respect to a rectified switchable charging path 202 provided by the power converter 106B. A resistor 210 is connected between the capacitors C1D, C2D. The capacitor C1D and the capacitor C2D are noise and suppression capacitors that are sized to filter out noise and suppress voltage and current spikes along the rectified switchable charging path 202. In one embodiment, the charging capacitor C1D is approximately 50 picofarads while the coupling capacitor is approximately 10 picofarads. The resistor 210 suppresses charging surges. In one embodiment, the resistor 210 has a resistance of approximately 20 Ohms. The decoupling stage 200 is coupled between the bus line 12 between the input terminal PCI and the input node to the rectified switchable charging path 202.

As shown in FIG. 9, the rectified switchable charging path 202 includes the rectifier D1, and a switch SD. In this embodiment, the rectified switchable charging path 202 is connected in series so that an input node of the rectified switchable charging path 202 is connected to the decoupling stage 200 while an output node to the reservoir capacitor CRES 1 of the rectified switchable charging path 202 is coupled to the reservoir capacitor CRES1. Like in the embodiment shown in FIG. 7, the first switchable bypass path 204 only includes the switch S1 and does not include a resistor in order to provide fast charging. However, in this embodiment, the first switchable bypass path 204 is connected in parallel with the second switchable bypass path 206. In this embodiment, the rectifier D1 is provided by a diode connected in series within the rectified switchable charging path 202 between the decoupling stage 200 and the reservoir capacitor CRES1. The rectifier D1, which in this case is a diode, is forward-biased from the input node to the output node so that charge from the input data signal SDATA can charges the reservoir capacitor CRES1. The rectifier D1 is also connected so that any discharge of the reservoir capacitor CRES1 is blocked by the rectifier D1. In this case, the rectifier D1 is connected between the input node and the switch SD.

The switch SD is coupled in series between the rectifier D1 and the output node of the rectified switchable charging path 202. The switch SD is configured to be opened and closed and thus the rectified switchable charging path 202 is configured to be opened and closed. In this embodiment, the switch SD is a PFET having a drain DSD coupled to the reservoir capacitor CRES1 and a source SSD coupled to a cathode of the rectifier D1. As such, the drain DSD of the switch SD will be biased to the supply voltage level when the switch SD is opened. Accordingly, the rectifier D1 cannot leak power even when the supply voltage level falls significantly if the switch SD is open. In this example, a gate GSD is coupled to receive a switch control signal CSD at the gate GSD to open and close the switch SD. Thus, the switch SD isolates the rectifier D1 from the output node and the reservoir capacitor CRES1 when the switch is open. In this example, the switch control signal CSD is provided to open and close the switch GSD.

In this embodiment, the rectifier D1 is a half-wave rectifier. All that is required by the rectifier D1 is that the rectifier D1 charges the reservoir capacitor CRES1 with the input data signal SDATA, but that discharge from the reservoir capacitor CRES1 be blocked by the rectifier D1. Thus, while input data signal SDATA is high and in a charging state, the rectifier D1 is coupled to transfer a charge into the reservoir capacitor CRES1 so that the reservoir capacitor CRES1 generates the supply voltage VS. However, while the input data signal SDATA is low, and thus in a discharging state, the rectifier D1 is coupled to block the discharge of the reservoir capacitor CRES1 in order to maintain the supply voltage level of the supply voltage VS relatively steady.

Like in the embodiments shown in FIG. 7 and FIG. 8, the first switchable bypass path 204 in FIG. 9 only includes the switch S1 and does not include a resistor in order to provide fast charging. However, in this embodiment, the first switchable bypass path 204 is connected in parallel with the second switchable bypass path 206. Thus the first switchable bypass path 204 is coupled between the decoupling stage 200 and the reservoir capacitor CRES1 so as to bypass the rectified switchable charging path rectifier D1 and so as to bypass the second switchable bypass path 206.

In this embodiment, the second switchable bypass path 206 is coupled between the decoupling stage 200 and the reservoir capacitor CRES1 such that the second switchable bypass path 206 is coupled to bypass the rectified switchable charging path 202. More specifically, the second switchable bypass path 206 shown in FIG. 9 is coupled in parallel with the rectified switchable charging path 202 and thus provides an alternate charging path. The second switchable bypass path 206 is switchable to be opened and closed and includes a resistor 214 coupled in series within the second switchable bypass path 206. The first switchable bypass path 204 is connected to the second switchable bypass path 206 such that the first switchable bypass path 204 is coupled to bypass the resistor 214 in the second switchable bypass path 206. More specifically, the first switchable bypass path 204 includes a switch S1 coupled in series within the first switchable bypass path 204. Thus, when the switch S1 is open, the first switchable bypass path 204 is open, and when switch S1 is closed, the first switchable bypass path 204 is closed. The second switchable bypass path 206 also includes a switch S2 coupled in series within the second switchable bypass path 206. Thus when the switch S2 is open, the second switchable bypass path 206 is open, and when the switch S2 is closed, the second switchable bypass path 206 is closed.

The power converter 106B in the slave bus controller 94 is configured to convert the input data signal SDATA into the supply voltage VS as mentioned above. In this manner, no other bus line but the bus line 12 needs to be provided since the power converter 106B in the slave bus controller can be utilized not only to transfer data from the master bus controller 96 to the slave bus controller 94 but also to provide power to the slave bus controller 94. The power converter 106B includes a reservoir capacitor CRES1 coupled to generate the supply voltage VS. The power converter 106B also includes a first switchable bypass path 204 and a second switchable bypass path 206. Both the first switchable bypass path 204 and the second switchable bypass path 206 are coupled between the bus line 12 and the reservoir capacitor CRES1 such that the first switchable bypass path 204 and the second switchable bypass path 206 are each coupled to bypass the rectified switchable charging path 202. The first switchable bypass path 204 is switchable to be opened and closed. Similarly, the second switchable bypass path 206 is also switchable to be opened and closed.

The third switchable bypass path 208 is switchable to be opened and closed. More specifically, the third switchable bypass path 208 includes a switch S3 that is operable to be opened and closed. Thus, the control circuitry 216 generates the control output 218 to include the switch control output CS1, the switch control output CS2 and a switch control output CS3. The switch S3 receives the switch control output CS3 from the control circuitry 216. When the control signal CS3 is in a first state, the switch S3 is open, and thus the third switchable bypass path 208 is open. On the other hand, when the control signal CS3 is in a second state, the switch CS3 is closed, and thus the third switchable bypass path 208 is closed. In this embodiment, the third switchable bypass path 208 only includes the switch S3 and does not include any resistor.

The third switchable bypass path 208 is coupled between the bus line 12 and the rectified switchable charging path 202 so as to bypass the resistor 210 of the decoupling stage 200. In this example, the supply voltage VS generated by the reservoir capacitor CRES1 is used as an analog supply voltage to supply analog components within the slave bus controller 94. The diode D2 is coupled between the reservoir capacitor CRES1 and the reservoir capacitor CRES2 such that the reservoir capacitor CRES2 is configured to generate a supply voltage VSD that is below the supply voltage VS. More specifically, the diode D2 is forward biased from the reservoir capacitor CRES1 to the reservoir capacitor CRES2. Thus there is a voltage drop from the reservoir capacitor CRES1 to the reservoir capacitor CRES2 equal approximately to the turn on voltage of the diode D2. In this embodiment, the supply voltage VSD is approximately 0.7 V below the supply voltage VS. The supply voltage VSD is used as a digital supply voltage in order to power digital components within the slave bus controller 94.

Referring now to FIGS. 2 and 9, the data modulator 98 is configured to generate the input data signal SDATA that defines the data pulses DP[0]-DP[6] during the data frame. As explained above with respect to FIG. 2, the voltage regulation circuit 102 is configured to convert the power source voltage VBAT into the supply voltage VD that powers the data modulator 98. As explained in further detail below, the data modulator 98 is configured to generate the data pulses DP[0]-DP[6] with the PFET FETM1 while the master switchable bypass path 150 is open. However, during a communication interlude after the activation edge AE[7] in FIG. 2, the control circuitry 152 is configured to close the master switchable bypass path 150. In this manner, the master bus controller 96 is configured to hold the input data signal SDATA in a charging state during the communication interlude between the master bus controller 96 and the slave bus controller 94. However, with respect to the master bus controller 96 shown in FIG. 9, the input data signal SDATA is held at approximately the supply voltage VD during the communication interlude since the master switchable bypass path 150 is closed.

Referring again to FIGS. 2 and 9, the power management system 100C is operable in the idling switch state, the communication session state, and the fast charging switch state like the power management system 100C described above with respect to FIG. 9. In response to the master bus controller 96 initiating communication of a data frame as shown during the time slot TS[IN], the control circuitry 216 of the slave bus controller 94 is configured to open the second switchable bypass path 206. Furthermore, in response to the master bus controller 96 initiating communication of the data frame, the control circuitry 152 of the master bus controller 96 is configured to open the master switchable bypass path 150. Thus, the power management system 100C is switched into the communication session state. With respect to FIG. 2, the master bus controller 96 initiates communication of a data frame as shown in FIG. 2 by dropping the input signal SDATA low during the times slot TS[IN]. The power management system 100C is provided in the communication session state while the master bus controller 96 and the slave bus controller 94 are communicating along the bus line 12. Thus, the data modulator 98 can provide the data pulses DP[0]-DP[6] during the timeslots TS[0]-TS[6] shown in FIG. 2. During the communication session state, the first switchable bypass path 204 is open, the second switchable bypass path 206 is open, the third switchable bypass path 208 is open, the master switchable bypass path 150 is open, and the rectified switchable charging path 202 is closed. Thus, the charge current passes through the resistor 210 and through to the rectified switchable charging path 202 to charge the capacitor CRES1.

In response to a communication interlude after the activation edge AE[7] between the master bus controller 96 and the slave bus controller 94, the control circuitry 216 is configured to generate the control signals CS1, CS2, CS3, CSD so that the first switchable bypass path 204 is closed, the second switchable bypass path 206 is closed, the third switchable bypass path 208 is closed, and the rectified switchable charging path 202 is open. Furthermore, the control circuitry 152 of the master bus controller 96 is configured to close the master switchable bypass path 150 in response to the communication interlude. Thus, the power management system 100C shown in FIG. 9 is switched into the fast charging switch state in response to the communication interlude. The power management system 100C is maintained in the fast charging switch state for the charging time interval after the beginning of the communication interlude. Thus during the fast charging switch state, the master bus controller 96 holds the input data signal SDATA approximately at the supply voltage VD. A charging current in the power converter 106B propagates through the third switchable bypass path 208 thereby bypassing the resistor 210 in the decoupling stage 200. The charging current also propagates through the first switchable bypass path 204 thereby bypassing the rectified switchable charging path 202 and the resistor 214 in the second switchable bypass path 206. In this manner, the charging current that recharges the reservoir capacitor CRES1 and the reservoir capacitor CRES2 experiences minimum resistance and is recharged faster.

Once the charging time interval has passed after the activation edge AE[7] has passed, during the idling switch state and before the initiation of a data frame, the control circuitry 216 of slave bus controller 94 is configured to generate the control signals CS1, CS2, CS3, CSD such that the first switchable bypass path 204 is open, the second switchable bypass path 206 is closed, the third switchable bypass path 208 is open, and the rectified switchable charging path 202 is closed. Furthermore, the control circuitry 152 of the master bus controller 96 is configured to generate the control signal SM such that the master switchable bypass path 150 is closed. Thus, during the idling switch state, the master bus controller 96 holds the input data signal SDATA at approximately the supply voltage VD. A charging current passes through the resistor 210 of the decoupling stage 200 and through the second switchable bypass path 206 to charge the reservoir capacitor CRES1. Furthermore, a charge current also passes through the rectifier D2 in order to charge the reservoir capacitor CRES2 so that the reservoir capacitor CRES2 generates the supply voltage VSD. The cycle is again repeated at the beginning of the next data frame.

The POR circuit 222 in the power converter 106B of the slave bus controller 94 is provided to monitor the supply voltage VSD. If the supply voltage VSD is provided below a threshold voltage, this indicates that the supply voltage VS and the supply voltage VSD are insufficient to provide sufficient power so as to operate the switches S1, S2, S3, SD of the power converter 106B. This may occur during dead battery conditions or at startup before the slave bus controller 94 has had sufficient time to be charged. The POR circuit 222 is configured to detect when the supply voltage VSD has been provided above the threshold voltage level. The POR circuit 222 generates a POR signal 232. The POR circuit 222 generates the POR signal 232 such that the POR signal 232 indicates that the supply voltage VSD is above the threshold voltage once the POR circuit 222 has detected that the supply voltage VSD is above the threshold voltage. The control circuitry 216 receives the POR signal 232. Once the POR signal 232 indicates that the supply voltage VSD is above the threshold voltage, the control circuitry 216 is configured to operate the switches S1, S2, S3, SD as described above. In particular, the control circuitry 216 may initially provide the switches S1, S2, S3 in the manner described above with respect to the idling switch state for the power management system 100C.

The WDC 224 in the power converter 106B of the slave bus controller 94 is configured to monitor the input data signal SDATA. In this example, the input data signal SDATA is an input data voltage. If the input data signal SDATA drops below a threshold voltage level for a temporal period, the WDC 224 detects a reset condition. In this case, the WDC 224 is configured to generate a watchdog signal 234 that indicates when the WDC 224 has detected the reset condition (i.e., the input data signal SDATA has been provided below the threshold voltage level for the time interval). The control circuitry 216 receives the watchdog signal 234 and responds by requesting a reset for the slave bus controller 94. It should be noted that power may be delivered from the capacitive element CRES to circuitry (e.g., decoder 10) within the slave bus controller 94 that the input data signal SDATA going low for a defined period results in a reset regardless.

In this embodiment, the switching regulator 108C includes a switch converter 250A and a linear voltage regulation circuit 252. As shown in FIG. 9, the power conversion circuitry 104C includes a switching regulator 108C. This switching regulator 108C is an embodiment of the switching regulator 108 shown in FIG. 5. The switching regulator 108C is thus configured to generate the charge current IS from the input data signal SDATA transmitted along the bus line 12 by the data modulator 98 of the master bus controller 96 in accordance with the PWM bus protocol. The switching regulator 108C is coupled to charge the reservoir capacitor CRES1 with the charge current IS. The switching regulator 108C is configured to generate the charge current IS such that the charge current IS regulates the supply voltage VS by charging the reservoir capacitor CRES1.

In this embodiment, the switch converter 250A is a switched voltage converter that converts charge from the input data signal SDATA into a charge voltage CVO. The switched converter in this example is switched capacitive converter that is configured to generate the charge voltage CVO when a set of capacitors are charged and discharged in different charging phases. The switch converter 250A shown in FIG. 9 is a capacitive voltage multiplier and thus is a type of charge pump. In FIG. 9, the switch converter 250A configured to generate the charge voltage CVO has a voltage magnitude that is approximately double the voltage level of the input data signal SDATA.

In this embodiment, the switch converter 250A has an input node SCI that is connected to the bus line 12 and an output node SCO that is connected to an input terminal IL of the linear voltage regulation circuit 252. Furthermore, the switch converter 250A forms a capacitive commutation circuit, as explained below. In this embodiment, the switch converter 250A forms a charge path 254 connected between the bus line 12 and the linear voltage regulation circuit 252. In this embodiment, the charge path 254 is connected between the input node SCI and an output node SCO. The output node SCO is connected to an input terminal IL of the linear voltage regulation circuit 252 and the input node SCI is connected to the bus line 12. The switch converter 250A shown in FIG. 9 includes an input capacitor 256, a commutation capacitor 258, and an output capacitor 260. The commutation capacitor 258 is connected in series within the charge path 254 between node 262 and node 264. The input capacitor 256 is connected in shunt with respect to the charge path 254 between the bus line 12 and the commutation capacitor 258 at node 266. The output capacitor 260 is connected in shunt with respect to the charge path 254 between the commutation capacitor 258 and the linear voltage regulation circuit 252 at node 268.

The charge path 254 forms an input branch 270 between the input node SCI and node 266. Thus, the input branch 270 is connected to the bus line 12 at the input node SCI and is connected to the input capacitor 256 at node 266. The switch converter 250A includes a line commutated semiconductor component 274 connected in series within the input branch 270. The line commutated semiconductor component 274 unilaterally conducts in a forward current direction. The line commutated semiconductor component 274 shown in FIG. 9 is connected in series within the input branch 270 so that the forward current direction is away from the bus line 12 and toward the commutation capacitor 258. Thus, line commutated semiconductor component 274 is configured to transmit a charge current 275 toward node 266 but block charge from node 266 toward node SCI. Accordingly, the input branch 270 is configured to block charge in the charge path 254 from passing to the bus line 12. Thus, the line commutated semiconductor component 274 in the input branch 270 is configured to prevent both the input capacitor 256 and the commutation capacitor 258 discharging into the bus line 12.

The switch converter 250A includes a switch 272 connected in series within the charge path 254 between node 262 and node 266. Thus, the switch 272 is connected to the commutation capacitor 258 at node 262 and is connected to the input branch 270 and the input capacitor 256 at node 266. The switch 272 is configured to be opened and closed. Thus, when the switch 272 is open, the switch 272 is configured to block charge at node 262 from passing to node 266 and to prevent charge at node 266 from passing towards node 262. However, when the switch 272 is closed, charge from node 266 can pass toward node 262 and charge from node 262 can pass towards node 266.

Furthermore, the switch converter 250A includes a switch 279 connected in shunt to the charge path 254 at node 262. The switch 279 is configured to be opened and closed. Thus, when the switch 279 is closed, node 262 is shunted to ground.

Additionally, the charge path 254 also forms an output branch 276 connected between node 264 and node 268. Thus, the output branch is connected to the commutation capacitor 258 at node 264 and is connected to the output capacitor 260, the output node SCO, and the input terminal IL of the linear voltage regulation circuit 252 at node 268. The switch converter 250A includes a line commutated semiconductor component 277 connected in series within the output branch between node 264 and node 268. Thus, the output branch is connected to the commutation capacitor 258 at node 264 and is connected to the output capacitor 260 at node 268. The line commutated semiconductor component 277 also unilaterally conducts in a forward current direction. The line commutated semiconductor component 277 shown in FIG. 9 is connected in series within the output branch so that the forward current direction is away from the commutation capacitor 258 and toward the output capacitor 260. Thus, line commutated semiconductor component 277 is configured to transmit a charge current 278 toward node 268 but block charge from node 268 toward node 264. Accordingly, the output branch is configured to prevent the output capacitor 260 and the linear voltage regulation circuit 252 from discharging through the charge path 254 towards the bus line 12.

The switch converter 250A also includes a self-commutated bypass path 281 connected between the input node SCI and node 264. Thus, the self-commutated bypass path 281 is connected to the bus line 12 at the input node SCI and is connected to the charge path 254 at node 264. The switch converter 250A includes a line commutated semiconductor component 280 connected in series within the within the self-commutated bypass path 281 between the input node SCI and node 264. The line commutated semiconductor component 280 also unilaterally conducts in a forward current direction. The line commutated semiconductor component 280 shown in FIG. 9 is connected in series within the self-commutated bypass path 281 so that the forward current direction is towards the charging path at node 264 and away from the input node SCI and the bus line 12. Thus, the line commutated semiconductor component 280 is configured to transmit a charge current 282 toward node 264 but block charge from node 264 toward the input node SCI. Since the output branch is connected between node 264 and node 268, and since the forward current direction of the output branch is from node 264 to node 268 then the charge current 282 is also transmitted to node 268. Thus, the self-commutated bypass path 281 is configured to charge the commutation capacitor 258 and the output capacitor 260 with charge from the bus line 12 but block charge from the charge path 254 at node 264 from discharging to the input node SCI and thus the bus line 12. Accordingly, the self-commutated bypass path 281 is configured to prevent the commutation capacitor 258 from being discharged by the bus line 12 but rather forces the commutation capacitor 258 to discharge from node 264 toward the output capacitor 260.

The linear voltage regulation circuit 252 is configured to generate the charge current IS in order to regulate the supply voltage VS from the charge voltage CVO. As mentioned above, the switch converter 250A is configured to generate the charge voltage CVO so that the charge voltage CVO is double the voltage level of the input data signal SDATA in the charging state. However, the charge voltage CVO does not reach double the voltage level as charge will drain from output capacitor 260 through the linear voltage regulation circuit 252 to CRES1. However, the linear voltage regulation circuit 252 limits the supply voltage level to a target voltage level, which is generally or may be slightly below the voltage level of the input data signal SDATA in the charging state. Thus, the linear voltage regulation circuit 252 is configured to drive the supply voltage level with the charge current IS to the target voltage level in response to the supply voltage level dropping below the target voltage level. However, the linear voltage regulation circuit 252 is configured to cut off the charge current IS once the supply voltage level reaches the voltage level of the input data signal SDATA.

In this embodiment, the linear voltage regulation circuit 252 includes a PFET 284 operating as a linear pass element and an op-amp 286. An input is connected to source SVR of the PFET 284. The source SVR is connected to the output node SCO to receive the charge voltage CVO. A drain DVR of the PFET 284 is connected to the reservoir capacitor CRES1. As such, the PFET 284 turns off once the supply voltage level exceeds the target voltage level.

A gate of the PFET 284 is connected to the op-amp 286. The op-amp 286 receives feedback from the reservoir capacitor CRES1 to measure the supply voltage level of the supply voltage VS at a non-inverting terminal of the op-amp 286. An inverting terminal is connected to receive a voltage from a charging capacitor 288 that sets the target voltage level. A switch 290 is connected between the charging capacitor 288 and the supply voltage level. The control circuitry 216 is configured to generate a switch control signal VRS that opens and closes the switch 290. In this embodiment, the control circuitry 216 is configured to close the switch 290 as soon as the input data signal SDATA is driven to the discharging state when a data frame is initiated during the initial time slot TS shown in FIG. 2. This charges the charging capacitor 288 and sets the target voltage level to the supply voltage level of the supply voltage VS before the reservoir capacitor CRES1 is drained during the data frame. After a small charging period, the switch 290 is opened again and is not closed again until the next initial time slot TS for the next data frame.

In this manner, the op-amp 286 turns on the PFET 284 and drives the supply voltage level to the target voltage level in response to the supply voltage level dropping below the supply voltage level. However, since the drain DVR is connected to the reservoir capacitor CRES, the PFET 284 cannot pull the supply voltage level higher than the target voltage level. Furthermore, the charge current IS is only generated once the charge voltage CVO pulls the source SVR above the voltage level of the input data signal SDATA. The switch converter 250A is configured to do that only when oscillation signal OVR_CLK is in a low voltage state during one of the oscillation pulses OS. As such, instead of the switch converter 250A doubling the charge voltage CVO, charge will pass from the switch converter 250A at the output node SCO through the PFET 284 to generate the charge current IS. The charge current IS is cut off again at the drain of the PFET 284 once the supply voltage level is above the voltage level of the input data signal SDATA. Thus, the linear voltage regulation circuit 252 is operably associated with the switch converter 250A so that the linear voltage regulation circuit 252 generates the charge current IS.

FIG. 10 illustrates one exemplary embodiment of a power management system 100D, along with ancillary circuitry. The power management system 100D is an example of the power management system 100 described above with respect to FIGS. 5 and 6. Accordingly, the power management system 100D that may be provided in the bus interface system 92 shown in FIG. 5 and FIG. 6.

The power management system 100D is provided in the bus interface system 92 to distribute power from the master bus controller 96 to the slave bus controller 94. Thus, the bus line 12 is provided in the bus interface system 92 to connect the master bus controller 96 is coupled to the slave bus controller 94. In accordance with the PWM bus protocol (such as the PWM bus protocols described above), the master bus controller 96 is configured to generate the input data signal SDATA and to transmit the input data signal SDATA along the bus line 12 to the slave bus controller 94. No other bus line is provided to couple the master bus controller 96 to the slave bus controller 94.

Again, as described above, the slave bus controller 94 is coupled to the bus line 12 so as to receive the input data signal SDATA from the master bus controller 96. The slave bus controller 94 includes the embodiment of the power conversion circuitry 104D. The power conversion circuitry 104D is configured to convert the input data signal SDATA into a supply voltage VS. The power conversion circuitry 104D shown in FIG. 10 is part of the power management system 100D that is provided in the slave bus controller 94. The supply voltage VS may be utilized to power the decoder 10 (shown in FIGS. 5 and 6) along with other circuitry in the slave bus controller 94.

In FIG. 10, the master bus controller 96 is the same as the embodiment shown in FIG. 9. The slave bus controller 94 includes another embodiment of a power conversion circuitry 104D, which is an embodiment of the power conversion circuitry 104 shown in FIG. 5 and FIG. 6. The power conversion circuitry 104D includes the same embodiment of the power converter 106B discussed above with respect to FIG. 9. The power conversion circuitry 104D also includes a switching regulator 108D, which is another embodiment of the switching regulator 108 shown in FIG. 5.

As shown in FIG. 10, the switching regulator 108D is thus configured to generate the charge current IS from the input data signal SDATA transmitted along the bus line 12 by the data modulator 98 of the master bus controller 96 in accordance with the PWM bus protocol. The switching regulator 108D is coupled to charge the reservoir capacitor CRES1 with the charge current IS. The switching regulator 108D is configured to generate the charge current IS such that the charge current IS regulates the supply voltage VS by charging the reservoir capacitor CRES1.

In this embodiment, the switching regulator 108D includes another of a switch converter 292. Additionally the switching regulator 108D also includes the linear voltage regulation circuit 252 shown in FIG. 10. With regards to the switch converter 292, the switch converter 292 includes the same input branch 270, the same input capacitor 256, the same output capacitor 260, and the same output branch 276 as the switch converter 292 described above in FIG. 9. Thus, the switch converter 292 includes a charge path 296 that includes the same input branch 270 and the same output branch 276 described above with respect to FIG. 9. However, the charge path includes a self-commutated branch 297 between the input branch 270 and the output branch 276.

The self-commutated branch 297 with a line commutated semiconductor component 298 having a forward direction from the input branch 270 to the output branch 276. In this embodiment, the switch converter 292 includes a flyback capacitor 300 connected between the self-commutated branch 297 and the output branch 276. The other side of the flyback capacitor 300 is connected to an output node of a pair of push pull transistors 302. The flyback capacitor 300 has a flyback capacitance that is approximately equal to the input capacitance of the input capacitor 256 and the output capacitance of the output capacitor 260. The input node of the push pull transistors 302 is connected to the input node SCI of the charge path 296.

Thus, when the input data signal SDATA is in the charging state, the input branch 270 generates the charge current 275, the self-commutated branch 297 generates the charge current 294, and the output branch 276 generates the charge current 278 until the input capacitor 256 at node 266, the flyback capacitor 300, and the output capacitor 260 at node 268 all are charged. More specifically, the input capacitor 256 is charged until the voltage at node 266 reaches a voltage level equal the voltage level of the input data signal SDATA minus the threshold voltage of line commutated semiconductor component 274. The flyback capacitor 300 is charged until the voltage at node 264 reaches a voltage level equal the voltage level of the input data signal SDATA minus the threshold voltage of line commutated semiconductor component 274 and minus the threshold voltage of line commutated semiconductor component 298. Finally, the output capacitor 260 is charged until the voltage at node 268 reaches the voltage level of the input data signal SDATA minus the threshold voltage of the line commutated semiconductor component 274, minus the threshold voltage of the line commutated semiconductor component 298, and minus the threshold voltage of line commutated semiconductor component 277. The push pull transistors 302 will put the other side of the flyback capacitor 300 to ground.

However, when the voltage level of the input data signal SDATA goes to the discharging state, the flyback capacitor 300 appears to be in series with the input capacitor 256. As a result, the charge current 278 will charge the output capacitor 260 until the output capacitor reaches approximately) 0.5 times the voltage level of the input data signal in the charging state. The linear voltage regulation circuit 252 is the same described above with respect to FIG. 9. However, since the charge path is simply opened and closed in accordance with the input data signal SDATA, the linear voltage regulation circuit 252 simply generates the charge current IS continuously as long as the supply voltage level is below the target voltage level. Thus, the charge current IS is not generated as a pulsed charge current.

Those skilled in the art will recognize improvements and modifications to the preferred embodiments of the present disclosure. All such improvements and modifications are considered within the scope of the concepts disclosed herein and the claims that follow.

What is claimed is:

1. A bus interface system, comprising:
   a one-wire bus line;
   a master bus controller coupled to the one-wire bus line, the master bus controller is configured to generate a first input data signal and to transmit the first input data signal along the one-wire bus line; and
   a slave bus controller coupled to the one-wire bus line so as to receive the first input data signal from the master bus controller, wherein the slave bus controller comprises power conversion circuitry configured to convert the first input data signal into a first supply voltage and to regulate the first supply voltage with a charge current, wherein the power conversion circuitry is operable to generate the charge current from the first input data signal.

2. The bus interface system of claim 1 wherein the power conversion circuitry comprises:
   a power converter coupled to the one-wire bus line, wherein the power converter is configured to convert the first input data signal into the first supply voltage; and
   a switching regulator coupled to the one-wire bus line, wherein the switching regulator is configured to regulate the first supply voltage with the charge current and is switchable so as to generate the charge current from the first input data signal.

3. The bus interface system of claim 2 wherein the power converter includes a reservoir capacitor and wherein:
   the power converter is configured to charge the reservoir capacitor with the first input data signal and block discharge from the reservoir capacitor so that the first supply voltage is generated by the reservoir capacitor; and
   the switching regulator is configured to charge the reservoir capacitor with the charge current such that the first supply voltage is regulated by the charge current.

4. The bus interface system of claim 3 wherein the switching regulator comprises a switch regulated capacitive flyback converter switchable to generate the charge current by storing and releasing charge from the first input data signal provided in a charging state, wherein the switch regulated capacitive flyback converter is enabled to generate a pulsed charge current in response to the first supply voltage drooping below a voltage level of the first input data signal and is configured to disable the pulsed charge current in response to the first supply voltage exceeding the voltage level of the first input data signal.

5. The bus interface system of claim 4 wherein the switch regulated capacitive flyback converter is operable to receive an oscillation signal, wherein the switch regulated capacitive flyback converter is configured to be switched by the oscillation signal so as to generate the pulsed charge current.

6. The bus interface system of claim 3 wherein the switching regulator comprises a switch regulated capacitive flyback converter that includes a first switchable charging path and a first flyback capacitor wherein:
   the first switchable charging path is connected between the one-wire bus line and the reservoir capacitor, wherein the first switchable charging path is configured to unilaterally conduct charge towards the reservoir capacitor and the first switchable charging path is switchable to transmit charge from the one-wire bus line to the reservoir capacitor when the first switchable charging path is closed and block charge to the reservoir capacitor from the first flyback capacitor when the first switchable charging path is open; and
   the first flyback capacitor is coupled to the first switchable charging path so that charge from the first input data signal is stored by the first flyback capacitor when the first switchable charging path is open and wherein a first flyback capacitance of the first flyback capacitor is substantially less than a reservoir capacitance of the reservoir capacitor so that charge stored by the first flyback capacitor is released toward the reservoir capacitor when the first switchable charging path is closed.

7. The bus interface system of claim 6 wherein the switch regulated capacitive flyback converter further comprises a switch control regulation circuit operable to receive an oscillation signal, wherein:
the switch control regulation circuit is configured to switch the first switchable charging path so that the charge current is generated as a pulsed charge current synchronized in accordance with the oscillation signal; and
the switch control regulation circuit is enabled to switch the first switchable charging path in response to the first supply voltage drooping below the first input data signal in a charging state and is configured to disable the pulsed charge current in response to the pulsed charge current charging the reservoir capacitor so that the first supply voltage is approximately equal to the first input data signal in the charging state.

8. The bus interface system of claim 6 wherein the switch regulated capacitive flyback converter further comprises a second switchable charging path and a second flyback capacitor wherein:
the second switchable charging path is connected between the one-wire bus line and the reservoir capacitor, wherein the second switchable charging path is configured to unilaterally conduct charge towards the reservoir capacitor and the second switchable charging path is switchable to transmit charge from the one-wire bus line to the reservoir capacitor when the second switchable charging path is closed and block charge to the reservoir capacitor from the one-wire bus line when the second switchable charging path is open; and
the second flyback capacitor is coupled to the second switchable charging path so that charge from the first input data signal is stored by the second flyback capacitor when the second switchable charging path is open and wherein a second flyback capacitance of the second flyback capacitor is substantially less than a reservoir capacitance of the reservoir capacitor so that charge stored by the second flyback capacitor is released toward the reservoir capacitor when the second switchable charging path is closed.

9. The bus interface system of claim 8 wherein the first flyback capacitance and the second flyback capacitance are approximately equal.

10. The bus interface system of claim 8 wherein the switch regulated capacitive flyback converter further comprises a switch control regulation circuit operable to receive an oscillation signal, wherein:
the switch control regulation circuit is configured to switch the first switchable charging path and the second switchable charging path so that the charge current is generated as a pulsed charge current synchronized in accordance with the oscillation signal; and
the switch control regulation circuit is enabled to switch the first switchable charging path and the second switchable charging path in response to the first supply voltage drooping below the first input data signal in a charging state and is configured to disable the pulsed charge current in response to the pulsed charge current charging the reservoir capacitor so that the first supply voltage is approximately equal to the first input data signal in the charging state.

11. The bus interface system of claim 10 wherein the switch control regulation circuit is configured to switch the first switchable charging path and the second switchable charging path in accordance with the oscillation signal so that the first switchable charging path is opened while the second switchable charging path is closed and so that the second switchable charging path is opened while the first switchable charging path is closed.

12. The bus interface system of claim 3 wherein the switching regulator comprises a switch converter and a linear voltage regulation circuit wherein:
the switch converter is coupled to the one-wire bus line, wherein the switch converter is switchable so as to generate a charging voltage from the first input data signal; and
the linear voltage regulation circuit is configured to generate the charge current from the charging voltage so that the charge current drives a first supply voltage level of the first supply voltage to a first target voltage level.

13. The bus interface system of claim 12 wherein the switch converter is a switched capacitive voltage converter.

14. The bus interface system of claim 13 wherein the switched capacitive voltage converter is a switched capacitive voltage multiplier.

15. The bus interface system of claim 13 wherein the switched capacitive voltage converter is a charge pump.

16. The bus interface system of claim 12 wherein the linear voltage regulation circuit is configured to generate the charge current from the charging voltage so that the charge current drives the first supply voltage level to the first target voltage level in response to the first supply voltage level drooping below the first target voltage level.

17. The bus interface system of claim 16 wherein the linear voltage regulation circuit is configured to block charge from the switch converter so that the first supply voltage level is prevented from being overcharged above the first target voltage level.

18. The bus interface system of claim 12 wherein the switch converter is switchable so as to commutate the first input data signal to generate the charging voltage and the linear voltage regulation circuit is operably associated with the switch converter such that the linear voltage regulation circuit is configured to generate the charge current as a pulsed charge current.

19. The bus interface system of claim 12 wherein the slave bus controller further comprises an oscillator wherein:
the oscillator is configured to generate an oscillation signal when activated and not generate the oscillation signal when deactivated, the oscillator is configured to be activated in response to the first input data signal being in a charging state and is configured to be deactivated in response to the first input data signal being in a discharging state; and
the switch converter is switched to commutate the first input data signal based on the oscillation signal from the oscillator.

20. The bus interface system of claim 19 wherein the switch converter is switchable so as to commutate charge from the first input data signal and the linear voltage regulation circuit is operably associated with the switch converter such that the linear voltage regulation circuit is configured to generate the charge current as a pulsed charge current synchronized in accordance with the oscillation signal.

* * * * *

UNITED STATES PATENT AND TRADEMARK OFFICE
CERTIFICATE OF CORRECTION

PATENT NO.        : 10,579,128 B2
APPLICATION NO.   : 15/443236
DATED             : March 3, 2020
INVENTOR(S)       : Christopher Truong Ngo et al.

Page 1 of 1

It is certified that error appears in the above-identified patent and that said Letters Patent is hereby corrected as shown below:

In the Specification

In Column 12, Line 7, replace "OVR_CLK" with --OVS_CLK--.

In Column 51, Line 42-43, replace "approximately) 0.5 times" with --approximately 1.5 times--.

Signed and Sealed this
Fifth Day of May, 2020

Andrei Iancu
*Director of the United States Patent and Trademark Office*